(12) United States Patent
Shinagawa et al.

(10) Patent No.: US 12,552,271 B2
(45) Date of Patent: *Feb. 17, 2026

(54) FUEL CELL SHIP

(71) Applicant: Yanmar Holdings Co., Ltd., Osaka (JP)

(72) Inventors: Manabu Shinagawa, Osaka (JP); Takehiro Maruyama, Osaka (JP); Yasuyoshi Yamaguchi, Osaka (JP); Takuya Hiraiwa, Osaka (JP); Yukihiko Kimura, Kunisaki (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 623 days.

This patent is subject to a terminal disclaimer.

(21) Appl. No.: 17/830,095

(22) Filed: Jun. 1, 2022

(65) Prior Publication Data
US 2022/0388405 A1    Dec. 8, 2022

(30) Foreign Application Priority Data
Jun. 2, 2021 (JP) .................................. 2021-092707

(51) Int. Cl.
*B60L 50/71* (2019.01)
*B60R 25/042* (2013.01)
(Continued)

(52) U.S. Cl.
CPC ............ *B60L 50/71* (2019.02); *B60R 25/042* (2013.01); *B63H 21/17* (2013.01);
(Continued)

(58) Field of Classification Search
CPC .. B63H 21/17; B63H 2021/003; B63H 21/38; B63B 21/21; B63B 11/04; B63B 11/02;
(Continued)

(56) References Cited

U.S. PATENT DOCUMENTS 8,123,577 B2 * 2/2012 Riggs ..................... H01M 12/06
440/6
8,683,937 B2 * 4/2014 Sancoff .................... B63G 8/36
114/61.15
(Continued)

FOREIGN PATENT DOCUMENTS

DE      102014213193 A1    1/2016
JP           S48-7491 A      1/1973
(Continued)

OTHER PUBLICATIONS

European Extended Search Report dated Nov. 14, 2022, issued in EP Application No. 22175800.6.
(Continued)

*Primary Examiner* — Daniel V Venne
(74) *Attorney, Agent, or Firm* — NORTON ROSE FULBRIGHT US LLP

(57) ABSTRACT

An exemplary fuel cell ship is a fuel cell ship for propelling a hull by using electric power supplied by a fuel cell that generates electric power through an electrochemical reaction of fuel, and includes at least one compartment including an emission source of the fuel, and a vent pipe through which the fuel in the compartment is released to outside of the hull. A release port of the vent pipe is located at a position higher than a cabin or a bridge provided on the hull.

4 Claims, 9 Drawing Sheets

(51) Int. Cl.
*B63H 21/00* (2006.01)
*B63H 21/17* (2006.01)
*H01M 8/04082* (2016.01)

(52) U.S. Cl.
CPC ... *H01M 8/04201* (2013.01); *B63H 2021/003* (2013.01); *H01M 2250/20* (2013.01)

(58) Field of Classification Search
CPC .............. B63B 17/0027; B63B 79/10; F17C 2201/0109; F17C 2201/035; F17C 2201/056; F17C 2205/0103; F17C 2205/0142; F17C 2205/0176; F17C 2205/0335; F17C 2221/012; F17C 2223/0123; F17C 2223/036; F17C 2250/0452; F17C 2260/038; F17C 2260/042; F17C 2270/0105; F17C 1/002; F17C 13/084; B63J 2/02; B63J 2/06; B63J 2/10; H01M 8/04947; H01M 8/04679; H01M 8/04753; H01M 8/04865; H01M 2250/20; H01M 8/249; H01M 8/0444; H01M 16/006; H01M 8/04932; H01M 8/04089; H01M 8/04201; H01M 8/04664; H01M 8/04955; H01M 50/35; H01M 2220/20; H01M 8/2475; H01M 8/04447; B60L 58/13; B60L 2240/54; B60L 50/71; B60L 2200/32; B60L 3/0053; B60L 50/70; B60L 58/30; Y02E 60/50; Y02T 90/40; Y02T 70/50
USPC .......................................... 440/1; 180/65.22
See application file for complete search history.

(56) References Cited

U.S. PATENT DOCUMENTS

| | | | |
|---|---|---|---|
| 10,364,009 B2* | 7/2019 | Sako | H01M 8/04089 |
| 11,852,256 B2* | 12/2023 | Michaeli | F16K 1/04 |
| 2006/0009092 A1* | 1/2006 | Krietzman | B63H 21/17 440/6 |
| 2006/0012248 A1* | 1/2006 | Matsushita | B60L 58/40 307/10.1 |
| 2007/0122667 A1* | 5/2007 | Kelley | C01B 3/382 429/513 |
| 2015/0280260 A1* | 10/2015 | Lee | H01M 8/04231 429/414 |
| 2020/0173406 A1 | 6/2020 | Widjeskog et al. | |

FOREIGN PATENT DOCUMENTS

| | | |
|---|---|---|
| JP | 2000-225853 A | 8/2000 |
| JP | 2013-230725 A | 11/2013 |
| JP | 2018-092815 A | 6/2018 |
| JP | 2019-524552 A | 9/2019 |
| WO | 2020182308 A1 | 9/2020 |

OTHER PUBLICATIONS

Japanese Office Action dated Oct. 22, 2024, issued in JP Application No. 2021-092707.

"Development and demonstration of PEM fuel-cell-battery hybrid system for propulsion of tourist boat" by Choeng Hoon Choi et al., published in International Journal of Hydrogen Energy, Elsevier, Amsterdam, NL, vol. 41, No. 5, on Jan. 21, 2016, pp. 3591-3599, XP029416166, ISSN: 0360-3199, DOI: 10.1016/J. ljhydene.2015.12.186.

* cited by examiner

FUEL CELL SHIP

CROSS-REFERENCE TO RELATED APPLICATIONS

This application is claims priority under 35 U.S.C. § 119 to JP Application No. 2021-092707 filed Jun. 2, 2021, the entire contents of which are hereby incorporated by reference.

TECHNICAL FIELD

The present invention relates to a fuel cell ship.

BACKGROUND ART

Conventionally, a fuel cell ship in which fuel is supplied from a fuel tank to a fuel cell and a propulsion device is driven by electric power generated by the fuel cell has been proposed (see, for example, Patent Document 1). In Patent Document 1, there is disclosed a configuration where if a lid member of a housing unit that houses a fuel cell unit and a hydrogen fuel tank is fraudulently opened, hydrogen is actively discharged from the hydrogen fuel tank to quickly deplete the fuel so that theft is prevented.

PRIOR ART DOCUMENT

Patent Document

Patent Document 1: Japanese Unexamined Patent Application Publication No. 2018-92815

SUMMARY OF INVENTION

Technical Problem

The fuel supplied to the fuel cell is a combustible gas such as hydrogen. Therefore, in the fuel cell ship, safe design and safety measures in consideration of a risk derived from the fuel are desired. Conventionally, there are known fuel cell ships for the purpose of preventing fuel thefts as described above, but it is considered that there is room for improvement in safety measures.

In view of the above circumstances, it is an object of the present invention to provide a fuel cell ship capable of reducing a risk derived from fuel.

Solution to Problem

An exemplary fuel cell ship according to the present invention is a fuel cell ship for propelling a hull by using electric power supplied by a fuel cell that generates electric power through an electrochemical reaction of fuel, and includes at least one compartment including an emission source of the fuel, and a vent pipe through which the fuel in the compartment is released to outside of the hull. A release port of the vent pipe is located at a position higher than a cabin or a bridge provided on the hull.

Advantageous Effects of Invention

According to the present invention, it is possible to provide a fuel cell ship capable of reducing a risk derived from fuel and improving safety.

DESCRIPTION OF EMBODIMENTS

An embodiment of the present invention will be described below based on the drawings. In this description, a direction is defined as follows. Firstly, a direction from the stern to the bow of the fuel cell ship is "front", and a direction from the bow to the stern is "rear". A lateral direction perpendicular to a front-rear direction is defined as a left-right direction. At this time, when the fuel cell ship is moving forward, the left side is defined as "left" and the right side is defined as "right" when viewed from an operator. The upstream side in the gravity direction perpendicular to the front-rear direction and the left-right direction is referred to as "up", and the downstream side is referred to as "down". Further, in the following, a case where the fuel is a gas will be described as an example, but the fuel is not limited to a gas and may be a liquid.

[1. Schematic Configuration of Fuel Cell Ship]

Figure 1:
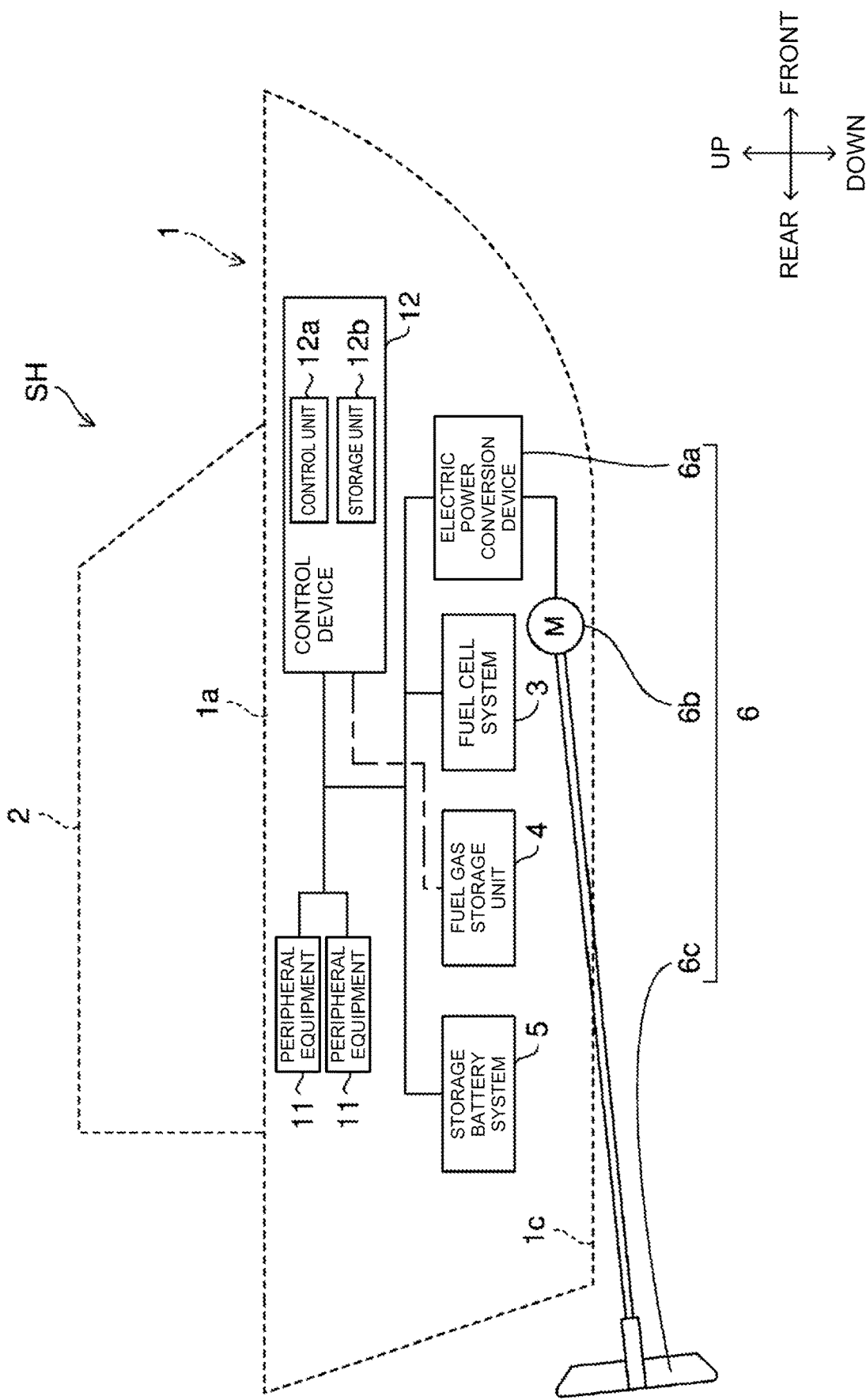
FIG. 1 is an explanatory diagram illustrating a schematic configuration of a fuel cell ship according to an embodiment of the present invention.

Firstly, a fuel cell ship SH according to the present embodiment will be described with reference to FIG. 1. FIG. 1 is an explanatory diagram illustrating a schematic configuration of the fuel cell ship SH. The fuel cell ship SH includes a hull 1 and a cabin 2. The cabin 2 is arranged on the hull 1. In the present embodiment, the cabin 2 includes a bridge.

The fuel cell ship SH further includes a fuel cell system 3, a fuel gas storage unit 4, a storage battery system 5, a propulsion device 6, a plurality of peripheral equipment 11, and a control device 12. In FIG. 1, a control signal or a high voltage power supply line is indicated by a solid line, and a control signal or a low voltage power supply line is indicated by an alternate long and short dash line.

The fuel cell system 3 functions as a main power supply. The fuel cell system 3 consumes a fuel gas to generate electric power (specifically, DC electric power). The fuel gas is a combustible gas. Typically, the fuel gas is hydrogen gas. The fuel cell system 3 supplies generated electric power to the propulsion device 6 and the peripheral equipment 11.

The fuel cell system 3 can also supply electric power to the storage battery system 5 to charge the storage battery system 5.

The fuel gas storage unit 4 stores the fuel gas to be supplied to the fuel cell system 3. The fuel gas is supplied from the fuel gas storage unit 4 to the fuel cell system 3 via a fuel gas supply pipe 32 described later (see FIG. 2).

The storage battery system 5 includes a storage battery. The storage battery is, for example, a lithium ion secondary battery, but may also be a nickel-cadmium storage battery, a nickel-hydrogen storage battery, or the like. The storage battery system 5 functions as an auxiliary power source for supplying the stored electric power (specifically, DC electric power) to the propulsion device 6 and the peripheral equipment 11. Thus, if the storage battery system 5 functions as an auxiliary power source, it is possible to compensate for a shortage of electric power supplied from the fuel cell system 3 to the propulsion device 6 or the like. The storage battery system 5 may supply electric power to the control device 12.

The propulsion device 6 is driven by electric power supplied from a below-described fuel cell 31 (see FIG. 2) of the fuel cell system 3, and generates a propulsive force on the hull 1. That is, the fuel cell ship SH propels the hull 1 by using the electric power supplied from the fuel cell 31.

It is noted that the propulsion device 6 may be driven only by the electric power supplied from the storage battery included in the storage battery system 5, or may be driven by the electric power supplied from both the fuel cell 31 and the storage battery. That is, the propulsion device 6 may be driven by the electric power supplied from at least one of the fuel cell and the storage battery to generate the propulsive force on the hull 1.

The propulsion device 6 includes an electric power conversion device 6a, a propulsion motor 6b, and a propeller 6c. The electric power conversion device 6a converts the electric power supplied from the fuel cell system 3 into electric power according to the specifications of the propulsion motor 6b. For example, the electric power conversion device 6a converts DC electric power into AC electric power. In this case, the electric power conversion device 6a has, for example, an inverter. The propulsion motor 6b is driven by electric power (for example, AC electric power) supplied from the electric power conversion device 6a. When the propulsion motor 6b is driven, the rotational force of the propulsion motor 6b is transmitted to the propeller 6c. As a result, the propeller 6c rotates, and a propulsive force is generated on the hull 1. A configuration may be employed in which a marine gear is provided between the propulsion motor 6b and the propeller 6c.

The peripheral equipment 11 include, for example a compressor, a solenoid valve, and a pump. The peripheral equipment 11 also include electrical equipment such as lighting equipment and air conditioning equipment, but the types of peripheral equipment 11 are not particularly limited.

The control device 12 controls the fuel cell system 3, the fuel gas storage unit 4, the storage battery system 5, the propulsion device 6, and a plurality of the peripheral equipment 11. The control device 12 is configured by, for example, one or more computers. The computer is, for example, an electronic control unit (ECU). The control device 12 may be configured by using a programmable logic controller (PLC). The control device 12 is supplied with the electric power from a battery (for example, a lead battery) not illustrated or from the storage battery of the storage battery system 5.

The control device 12 has a control unit 12a and a storage unit 12b. The control unit 12a includes a processor such as a central processing unit (CPU). The storage unit 12b includes a storage device and stores data and computer programs. Specifically, the storage unit 12b includes a main storage device such as a semiconductor memory and an auxiliary storage device such as a semiconductor memory, a solid state drive, and/or a hard disk drive. The storage unit 12b may also include removable media.

The processor of the control unit 12a executes a computer program stored in the storage device of the storage unit 12b to control the fuel cell system 3, the fuel gas storage unit 4, the storage battery system 5, the propulsion device 6, and the plurality of peripheral equipment 11.

[2. Overview of Internal Structure of Fuel Cell Ship]

Figure 2:
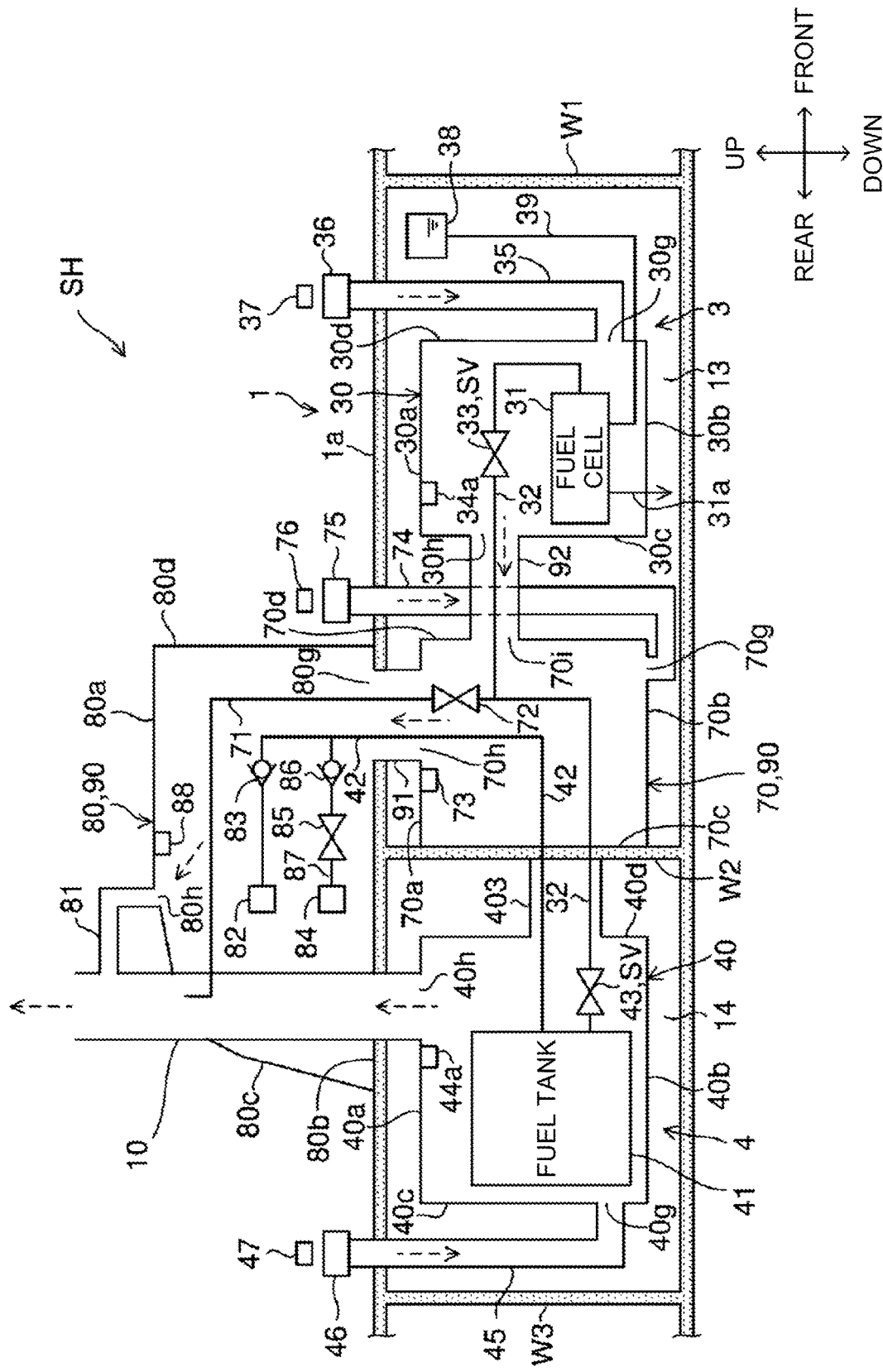
FIG. 2 is an explanatory diagram schematically illustrating an internal structure of the fuel cell ship.

Next, with reference to FIG. 2, an internal structure of the fuel cell ship SH will be described. FIG. 2 is an explanatory diagram schematically illustrating the internal structure of the fuel cell ship SH. In FIG. 2, the air flow is indicated by a dashed line arrow. In FIG. 2, the right side of the drawing is the bow side (front side), the left side of the drawing is the stern side (rear side), and each member is illustrated; however, the position of the member is not limited to the position illustrated in FIG. 2 as long as the connection relationship of the member is maintained.

The fuel cell ship SH includes an engine room 13 and a fuel room 14. The engine room 13 and the fuel room 14 are arranged below a deck 1a of the hull 1. The engine room 13 is located at the front side with respect to the fuel room 14. Partition walls W1, W2, and W3 are located below the deck 1a in order from the front side to the rear side. The engine room 13 is separated from other spaces by the partition walls W1 and W2. The fuel room 14 is separated from other spaces by the partition walls W2 and W3. The partition walls W1 to W3 are configured of, for example, fiber reinforced plastics (FRP), but may be iron plates or the like.

(2-1. Configuration of Fuel Cell System)

The fuel cell system 3 of the fuel cell ship SH is located in the engine room 13. The fuel cell system 3 includes the fuel cell 31, the fuel gas supply pipe 32, and a fuel cell side shutoff valve 33.

The fuel cell 31 generates electric power (specifically, DC electric power) through an electrochemical reaction between the fuel gas and oxidant gas. Typically, the oxidant gas is air and the oxidant is oxygen. That is, the fuel cell 31 generates electric power through the electrochemical reaction of the fuel.

The fuel cell 31 is a fuel cell stack configured by stacking a plurality of cells. For example, each cell of the fuel cell 31 has a solid polymer electrolyte membrane, an anode electrode, a cathode electrode, and a pair of separators. The solid polymer electrolyte membrane is sandwiched between the anode electrode and the cathode electrode. The anode electrode is a negative electrode (fuel electrode). The anode electrode includes an anode catalyst layer and a gas diffusion layer. The cathode electrode is a positive electrode (air electrode). The cathode electrode includes a cathode catalyst layer and a gas diffusion layer. The anode electrode, the solid polymer electrolyte membrane, and the cathode electrode form a membrane electrode assembly (MEA). The pair of separators sandwich the membrane electrode assembly. Each separator has a plurality of grooves. Each groove of one separator forms a flow path for the fuel gas. Each groove of the other separator forms a flow path for the oxidant gas.

In the configuration described above of the fuel cell 31, hydrogen included in the fuel gas is decomposed into hydrogen ions and electrons by the catalyst on the anode electrode side. Hydrogen ions pass through the solid polymer electrolyte membrane and move to the cathode electrode side. On the other hand, the electrons move to the cathode electrode side through an external circuit. As a result, an electric current is generated (electric power is generated). On the cathode electrode side, oxygen included in the oxidant gas combines with the electrons flowing through the external circuit and hydrogen ions transmitting the solid polymer electrolyte membrane to generate water. The generated water is discharged outside the ship via a discharge pipe 31a.

The fuel cell 31 supplies generated electric power to the propulsion device 6 and the peripheral equipment 11 illustrated in FIG. 1. The fuel cell 31 may indirectly supply generated electric power to the propulsion device 6 and the peripheral equipment 11 via a circuit such as a DC/DC converter.

The fuel gas supply pipe 32 is a pipe for supplying a fuel gas stored in a fuel tank 41 described later of the fuel gas storage unit 4 to the anode electrode of the fuel cell 31. That is, the fuel cell ship SH includes the fuel gas supply pipe 32 through which the fuel gas is supplied from the fuel tank 41 to the fuel cell 31.

The fuel cell side shutoff valve 33 is an example of a shutoff valve SV that opens or closes the flow path of the fuel gas supply pipe 32. The opening and closing of the fuel cell side shutoff valve 33 is controlled by the control unit 12a (refer to FIG. 1). More specifically, the fuel cell side shutoff valve 33 switches between supplying and stopping the supply of the fuel gas from the fuel tank 41 to the fuel cell 31, based on the control of the control unit 12a. Although only one fuel cell side shutoff valve 33 is provided in the fuel gas supply pipe 32 in a fuel cell compartment 30 arranged with the fuel cell 31, two or more fuel cell side shutoff valves 33 may be provided. It is noted that the fuel cell compartment 30 provided in the fuel cell ship SH will be described in detail below.

The fuel cell system 3 further includes a cooling medium tank 38 and a cooling medium pipe 39. The cooling medium tank 38 stores cooling medium for cooling the fuel cell 31. The cooling medium may be, for example, an antifreeze liquid having low electrical conductivity. The antifreeze liquid is, for example, a liquid obtained by mixing pure water and ethylene glycol in a predetermined ratio. The cooling medium tank 38 is sealed, but an upper portion may be open.

The cooling medium pipe 39 is a pipe for circulating the cooling medium between the fuel cell 31 and a heat exchanger not illustrated. A circulation pump not illustrated is also provided at a location along the cooling medium pipe 39. The fuel cell 31 is cooled by driving the circulation pump to supply the cooling medium from the heat exchanger to the fuel cell 31 via the cooling medium pipe 39. The cooling medium supplied for cooling the fuel cell 31 is also supplied to the cooling medium tank 38 via the cooling medium pipe 39. Therefore, a volume change due to a temperature change of the cooling medium is absorbed, and the amount of the cooling medium liquid is monitored.

(2-2. Configuration of Fuel Gas Storage Unit)

The fuel gas storage unit 4 of the fuel cell ship SH has the fuel tank 41, a gas filling pipe 42, and a tank side shutoff valve 43.

The fuel tank 41 is a container in which fuel is housed. In the present embodiment, the fuel tank 41 stores the fuel gas to be supplied to the fuel cell 31. The fuel tank 41 may be, for example, a bomb, a cylinder, and a curdle in which a plurality of cylinders are assembled. In FIG. 2, for convenience, only one fuel tank 41 is illustrated, but the number of the fuel tanks 41 is not particularly limited and there may be a plurality of the fuel tanks 41.

The gas filling pipe 42 is a pipe for replenishing the fuel tank 41 with the fuel gas or filling the fuel tank 41 with an inert gas. One end side of the gas filling pipe 42 is connected to the fuel tank 41. The other end side of the gas filling pipe 42 is branched into two, and connected to both a fuel gas filling port 82 and an inert gas filling port 84. The fuel gas filling port 82 and the inert gas filling port 84 are provided in a duct compartment 90 (particularly an upper duct compartment 80) described in detail later.

The above-mentioned inert gas is, for example, nitrogen gas. For example, when the fuel gas remains in the fuel tank 41 in performing maintenance such as inspection or repair of the fuel cell ship SH in the dock (dry dock), there is a danger that an explosion may occur in a case that the fuel gas ignites for some reason. Therefore, at the time of maintenance of the fuel cell ship SH, the fuel tank 41 is filled with the inert gas, and the fuel gas is removed from the fuel tank 41. As a result, it is possible to avoid the danger of explosion.

In the fuel gas supply pipe 32 described above, a side opposite to the side connected with the fuel cell 31 is connected to the fuel tank 41. The fuel tank 41 and the fuel cell 31 are connected via the fuel gas supply pipe 32. That is, the fuel cell ship SH further includes a fuel supply pipe connecting the fuel tank 41 and the fuel cell 31. The fuel gas supply pipe 32 is an example of the fuel supply pipe.

The tank side shutoff valve 43 is an example of a shutoff valve SV that opens or closes the flow path of the fuel gas supply pipe 32. The opening and closing of the tank side shutoff valve 43 is controlled by the control unit 12a. More specifically, the tank side shutoff valve 43 switches between supplying and stopping the supply of the fuel gas from the fuel tank 41 to the fuel cell 31, based on the control of the control unit 12a. Although only one tank side shutoff valve 43 is provided in the fuel gas supply pipe 32 in a tank compartment 40 arranged with the fuel tank 41, two or more tank side shutoff valves 43 may be provided. It is noted that the tank compartment 40 provided in the fuel cell ship SH will be described in detail below.

[3. Compartment in Detail]

The fuel cell ship SH includes at least one compartment including an emission source of the fuel. In the present embodiment, the fuel is a fuel gas, and more specifically, hydrogen gas. The emission source of the fuel includes a wide range of portions from which the fuel gas may be released. The emission source of the fuel is, for example, the fuel cell 31, the fuel gas supply pipe 32, and the fuel tank 41. For example, the compartment includes the tank compartment 40 installed therein with a fuel tank that stores the fuel.

In the present embodiment, the compartment includes a plurality of the compartments. As illustrated in FIG. 2, in the present embodiment, the plurality of compartments include the fuel cell compartment 30 and the tank compartment 40. The fuel cell compartment 30 is a compartment installed therein with the fuel cell 31.

In the present embodiment, the plurality of compartments further includes the duct compartment 90. The duct compartment 90 is a compartment that houses a part of the fuel supply pipe. Specifically, the duct compartment 90 is configured by a lower duct compartment 70 and the upper duct compartment 80. The lower duct compartment 70 houses a part of the fuel gas supply pipe 32 being an example of a fuel supply pipe. The "part of the fuel gas supply pipe 32" may refer to an entire part or a part of a portion of the fuel gas supply pipe 32 located between the fuel cell compartment 30 and the tank compartment 40. In the present embodiment, the lower duct compartment 70 houses a part of the portion located between the fuel cell compartment 30 and the tank compartment 40 of the fuel gas supply pipe 32. It is noted that the duct compartment 90 is not an essential configuration and may not be provided in some cases. A configuration in which the duct compartment 90 is not provided will be described later.

Figure 3:
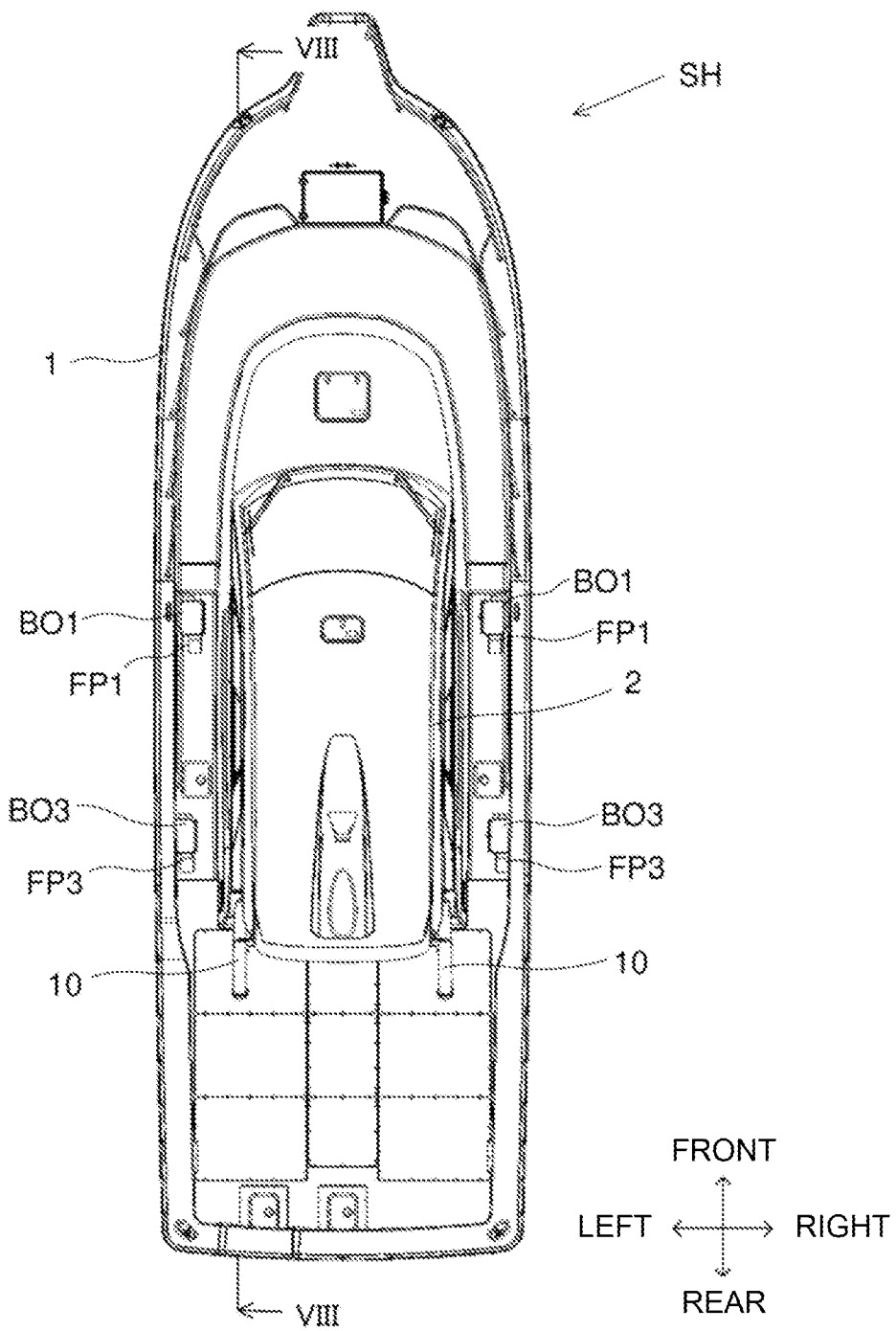
FIG. 3 is a plan view illustrating a detailed example of the fuel cell ship according to an embodiment of the present invention.
Figure 4:
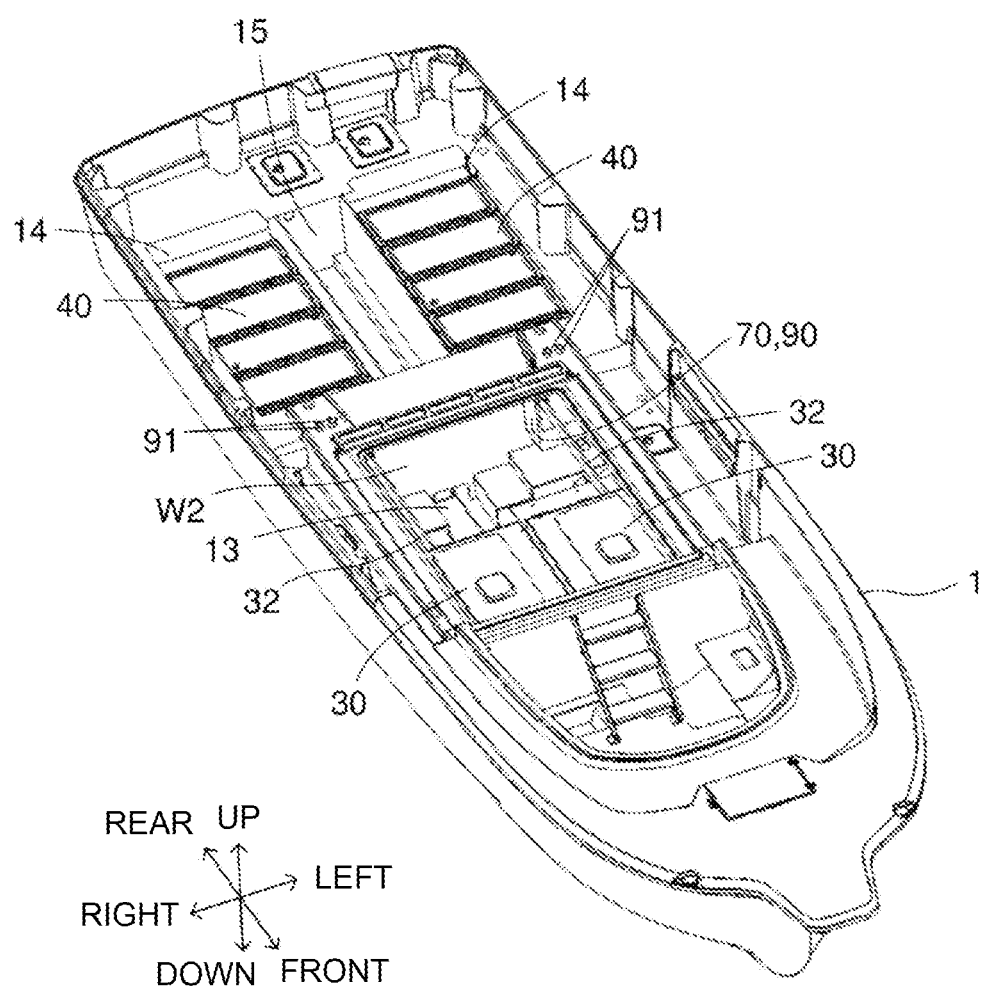
FIG. 4 is a perspective view obtained when a part of configuration such as a cabin is removed from the fuel cell ship illustrated in FIG. 3.
Figure 5:
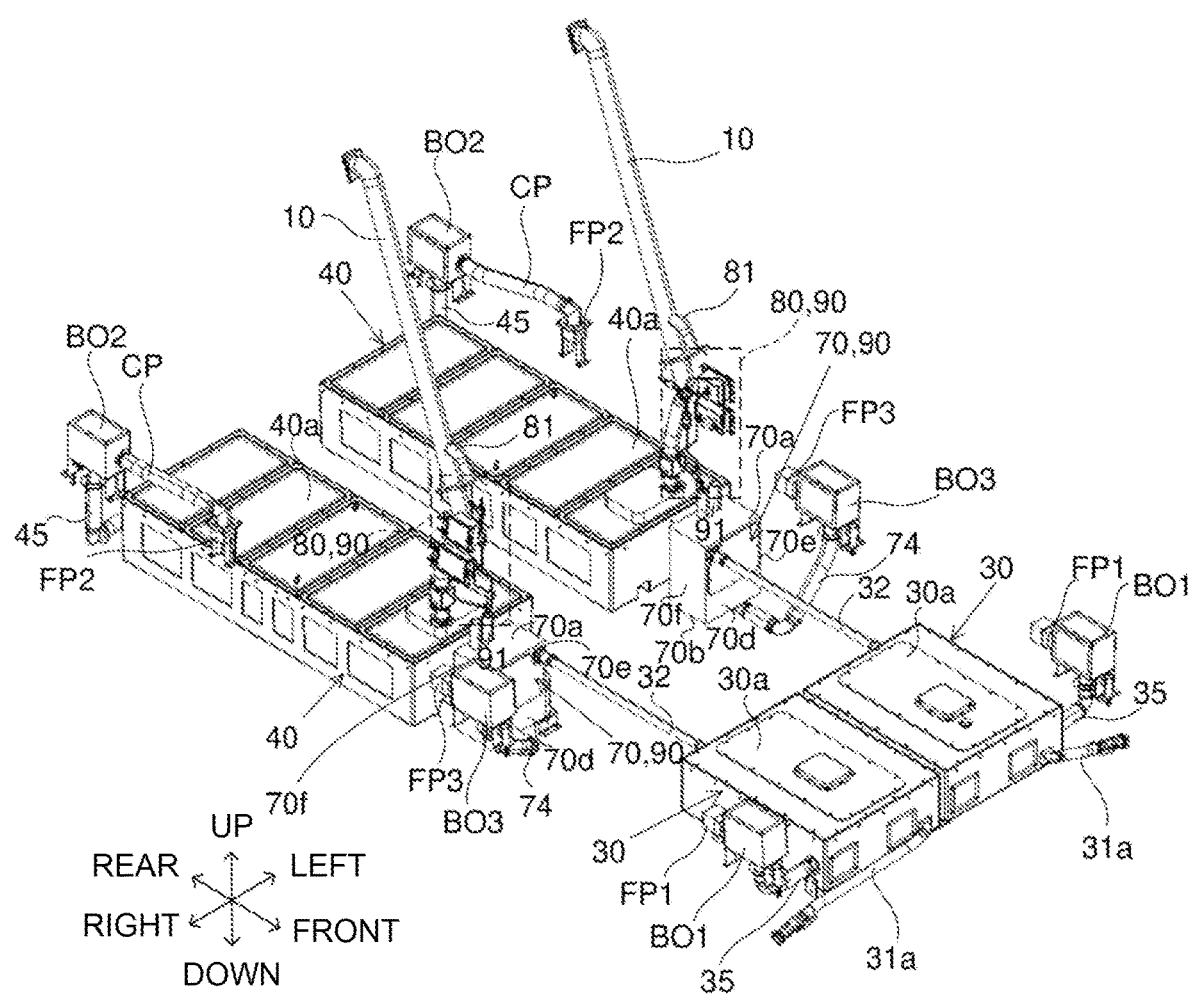
FIG. 5 is a schematic perspective view illustrating a state obtained when a fuel cell compartment, a tank compartment, and a duct compartment provided in the fuel cell ship illustrated in FIG. 4 are extracted.

Configurations of the fuel cell compartment 30, the tank compartment 40, and the duct compartment 90 will be described in detail below. FIG. 3 is a plan view illustrating a detailed example of the fuel cell ship SH. FIG. 4 is a perspective view obtained when a part of configuration such as the cabin 2 is removed from the fuel cell ship SH illustrated in FIG. 3. It is noted that in FIG. 4, a part of the deck 1*a* is also removed so that the tank compartment 40 and the duct compartment 90 can be seen. FIG. 5 is a schematic perspective view illustrating a state obtained when the fuel cell compartment 30, the tank compartment 40, and the duct compartment 90 provided in the fuel cell ship SH illustrated in FIG. 4 are extracted.

In the fuel cell ship SH illustrated in FIG. 3, the upper duct compartment 80, which is a part of the duct compartment 90, is configured by using the cabin 2. Therefore, in FIG. 4 illustrating the fuel cell ship SH from which the cabin 2 is removed, the upper duct compartment 80 is not illustrated. Also in FIG. 5, the upper duct compartment 80 is not illustrated in detail, and a surrounding area of the upper duct compartment 80 is illustrated by a broken line frame.

As illustrated in FIGS. 4 and 5, in the present embodiment, in the fuel cell ship SH, the fuel cell compartment 30, the tank compartment 40, and the duct compartment 90 are arranged on each of the left side (port side) and the right side (starboard side) of the hull 1. That is, the equipment necessary for generating the electric power using the fuel cell 31 is provided on each of the left and right sides of the hull 1. Thus, FIG. 2 above is a diagram illustrating, in detail, the configuration of one side portion (one board) of the hull 1.

In the present embodiment, the fuel cell compartment 30, the duct compartment 90, and the tank compartment 40 are arranged in this order from the front to the rear on each of the left and right sides. The configurations of the compartments 30, 40, and 90 are the same in the left and right compartments. In the present embodiment, each compartment set includes two fuel cell compartments 30, tank compartments 40, and duct compartments 90. However, this is an example, and the number of the compartment sets may be one or three or more.

(3-1. Fuel Cell Compartment)

Figure 6:
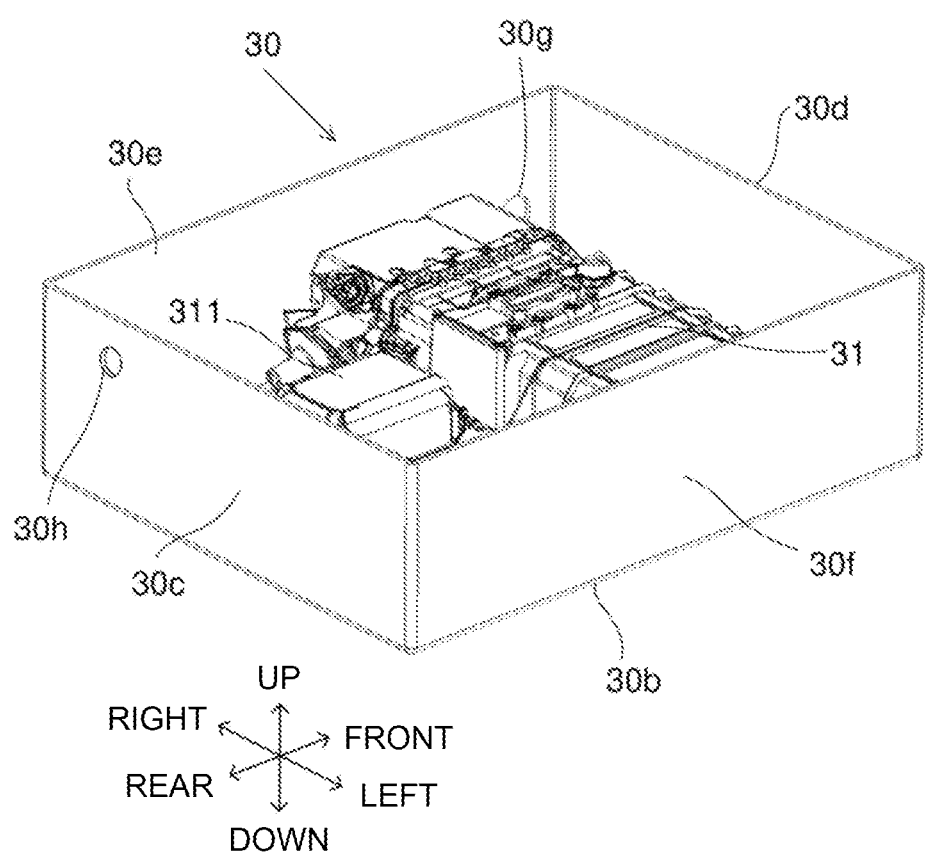
FIG. 6 is a schematic perspective view obtained when a top wall of the fuel cell compartment illustrated in FIG. 5 is removed.

The fuel cell compartment 30 is a housing body for housing the fuel cell 31 (see, for example, FIG. 2 and FIG. 6 described later). The fuel cell compartment 30 is arranged in the engine room 13 (see, for example, FIGS. 2 and 4). The fuel cell compartment 30 has a hollow shape. The fuel cell compartment 30 can also be thought of as a container, a chamber, or a box that houses the fuel cell 31.

In the present embodiment, the fuel cell compartment 30 has a hollow and substantially rectangular parallelepiped shape. An outer wall configuring the fuel cell compartment 30 includes, for example, a top wall 30*a*, a bottom wall 30*b*, a rear wall 30*c*, a front wall 30*d*, a left wall 30*e*, and a right wall 30*f* (for example, see FIGS. 2, 5, and 6 described later). It is noted that the shape of the fuel cell compartment 30 is not particularly limited as long as it has a space capable of housing the fuel cell 31. The material of the outer wall of the fuel cell compartment 30 is, for example, FRP, but may be an iron plate and the like.

In detail, the fuel cell compartment 30 is a configuration in which the top wall 30*a* is attached to a box-shaped members in which the bottom wall 30*b*, the rear wall 30*c*, the front wall 30*d*, the left wall 30*e*, and the right wall 30*f* are formed of a single member. FIG. 6 is a schematic perspective view obtained by removing the top wall 30*a* of the fuel cell compartment 30 illustrated in FIG. 5. In detail, FIG. 6 illustrates the fuel cell compartment 30 located on the left side of the hull 1. As illustrated in FIG. 6, in detail, the fuel cell compartment 30 houses a DC/DC converter 311 in addition to the fuel cell 31. In detail, the DC/DC converter 311 boosts the voltage of the electric power generated by the fuel cell 31. It is noted that the DC/DC converter 311 may be arranged outside the fuel cell compartment 30.

As illustrated in FIG. 2, a part of the fuel gas supply pipe 32 described above and the fuel cell side shutoff valve 33 are further housed in the fuel cell compartment 30. A cell compartment internal gas detector 34*a* is further housed in the fuel cell compartment 30. The cell compartment internal gas detector 34*a* is a fuel gas detector arranged inside the fuel cell compartment 30. For example, when the fuel gas is hydrogen gas, the cell compartment internal gas detector 34*a* is configured by a hydrogen gas detection sensor.

The cell compartment internal gas detector 34*a* is arranged on an inner surface of the top wall 30*a* located at an upper part of the fuel cell compartment 30. Hydrogen gas as the fuel gas is lighter than air and rises. Therefore, if the cell compartment internal gas detector 34*a* is arranged on the top wall 30*a* of the fuel cell compartment 30, leaked fuel gas can be appropriately detected by the cell compartment internal gas detector 34*a* even if the fuel gas leaks in the fuel cell compartment 30.

When the cell compartment internal gas detector 34*a* detects a fuel gas in the fuel cell compartment 30, a detection signal is sent from the cell compartment internal gas detector 34*a* to the control unit 12*a*. As a result, the control unit 12*a* can control the fuel cell side shutoff valve 33 provided in the fuel gas supply pipe 32 to stop the supply of the fuel gas from the fuel tank 41 to the fuel cell 31.

The fuel cell compartment 30 includes a ventilation port for ventilating the inside of the compartment. In detail, as illustrated in FIGS. 2 and 6, the ventilation port of the fuel cell compartment 30 includes a cell compartment air supply port 30*g* and a cell compartment exhaust port 30*h*.

The cell compartment air supply port 30*g* is provided on one of the left and right outer walls of the fuel cell compartment 30. In the fuel cell compartment 30 on the left side of the hull 1, the cell compartment air supply port 30*g* is configured to include an opening penetrating the left wall 30*e* in the left-right direction. In the fuel cell compartment 30 on the right side of the hull 1, the cell compartment air supply port 30*g* is configured to include an opening penetrating the right wall 30*f* in the left-right direction. The cell compartment air supply port 30*g* is connected to a cell compartment air supply pipe 35 described later. It is noted that a place where the cell compartment air supply port 30*g* is provided may be appropriately changed, and may be another outer wall configuring the fuel cell compartment 30.

The cell compartment exhaust port 30*h* is provided on the rear wall 30*c* of the fuel cell compartment 30 in each of the fuel cell compartments 30 arranged on the left and right sides of the hull 1. The cell compartment exhaust port 30*h* is configured to include an opening penetrating the rear wall 30*c* in the front-rear direction. The cell compartment exhaust port 30*h* communicates with the duct compartment 90, which will be described later. The cell compartment exhaust port 30*h* may be provided on an outer wall other than the rear wall 30*c* in the fuel cell compartment 30.

The cell compartment air supply pipe 35 is connected to the fuel cell compartment 30. The cell compartment air supply pipe 35 extends from the cell compartment air supply port 30*g* of the fuel cell compartment 30 to the deck 1*a* and is exposed from the top of the deck 1*a*. A cell compartment air supply device 36 and a cell compartment external gas detector 37 are arranged at an end on the deck 1*a* side of the cell compartment air supply pipe 35. More particularly, the cell compartment air supply device 36 and the cell compartment external gas detector 37 are arranged above the deck 1*a*.

The cell compartment air supply device 36 supplies air outside the fuel cell compartment 30 (in the present example, air outside the ship) to the inside of the fuel cell compartment 30 via the cell compartment air supply pipe 35 and the cell compartment air supply port 30*g*. Due to the supply of air outside the fuel cell compartment 30, the air inside the fuel cell compartment 30 is discharged to the duct compartment 90 via the cell compartment exhaust port 30*hf*. Thus, the inside of the fuel cell compartment 30 is ventilated. As a result, it is possible to prevent a combustible gas (for example, a fuel gas leaking from the fuel cell 31) from staying in the fuel cell compartment 30.

The cell compartment air supply device 36 is configured by, for example, an inexpensive non-explosion-proof air supply fan, but may be configured by an explosion-proof air supply fan. The drive of the cell compartment air supply device 36 is controlled by the control unit 12*a*. The cell compartment air supply device 36 is housed in an air supply device housing BO1 (see, for example, FIGS. 3 and 5) fixedly arranged on the deck 1*a*. The material configuring the air supply device housing BO1 is not particularly limited, but is configured of a metal such as stainless steel.

A filter unit FP1 is arranged adjacent to the air supply device housing BO1 that houses the cell compartment air supply device 36. The inside of the air supply device housing BO1 and the inside of the filter unit FP1 communicate with each other. One or more filters are arranged inside the filter unit FP1. When the filter unit FP1 is arranged, it is possible to prevent dust and the like from entering the fuel cell compartment 30. In the present embodiment, a dustproof filter and a salt damage countermeasure filter are arranged in the filter unit FP1. As a result, it is possible to prevent dust and sea salt particles from entering the fuel cell compartment 30.

It is noted that a configuration may be employed where only the salt damage countermeasure filter is arranged in the filter unit FP1, and even in this configuration, it is possible to remove the dust and sea salt particles. However, as the configuration where the dustproof filter and the salt damage countermeasure filter are arranged in the filter unit FP1, it is preferable to arrange the dustproof filter on the upstream side of the air flow generated by the cell compartment air supply device 36 with respect to the salt damage countermeasure filter. With such a configuration, it is possible to remove the dust by the dustproof filter before the salt damage countermeasure filter, and it is possible to remove the dust and the sea salt particles while extending the life of the expensive salt damage countermeasure filter.

The cell compartment external gas detector 37 detects a combustible gas (for example, hydrogen gas floating around the hull 1) flowing into the fuel cell compartment 30 from the outside. The cell compartment external gas detector 37 is, for example, a combustible gas sensor such as a hydrogen gas sensor. In the present embodiment, the cell compartment external gas detector 37 is arranged in the air supply device housing BO1. The cell compartment external gas detector 37 is, for example, arranged on a side opposite to the cell compartment air supply pipe 35 with respect to the cell compartment air supply device 36, that is, on the upstream side of the air flow from the outside into the fuel cell compartment 30. The cell compartment external gas detector 37 may be configured by a gas sensor that detects a combustible gas other than hydrogen gas. Examples of the combustible gas other than hydrogen gas include methane, ethane, propane, and carbon monoxide.

The cell compartment external gas detector 37 outputs, for example, a detection signal indicating the concentration of the combustible gas to the control unit 12*a*. This allows the control unit 12*a* to determine, based on the detection signal, whether the concentration of the combustible gas is equal to or greater than a predetermined threshold value. Then, if the concentration is equal to or greater than the predetermined threshold value, the control unit 12*a* can control the fuel cell side shutoff valve 33 to stop the supply of the fuel gas from the fuel tank 41 to the fuel cell 31. The above-mentioned predetermined threshold value may be determined based on experiments and/or experience.

It is noted that on the top wall 30*a* located at an upper part of the fuel cell compartment 30, the above-described cell compartment internal gas detector 34*a* (see FIG. 2) is preferably arranged at a location near the cell compartment exhaust port 30*h* or inside the cell compartment exhaust port 30*h*. In an unlikely event of fuel gas leak in the fuel cell compartment 30, the leaked fuel gas is exhausted through the cell compartment exhaust port 30*h*. That is, the cell compartment exhaust port 30*h* is located on the most downstream side of the flow path through which the fuel gas flows when the fuel gas leaks inside the fuel cell compartment 30. Therefore, when the cell compartment internal gas detector 34*a* is arranged at a location near the cell compartment exhaust port 30*h* or inside the cell compartment exhaust port 30*h*, even if the fuel gas leaks at any location inside the fuel cell compartment 30, it is possible to improve the possibility that the leaked fuel gas can be detected. That is, the cell compartment internal gas detector 34*a* may be configured to be located on the most downstream side of the flow path through which the fuel gas flows when the fuel gas leaks.

The fuel cell compartment 30 has a sealed space therein except for the cell compartment air supply port 30*g* and the cell compartment exhaust port 30*h*. That is, the fuel cell compartment 30 is sealed except for the cell compartment air supply port 30*g* and the cell compartment exhaust port 30*h*. In other words, the fuel cell compartment 30 is sealed except for a ventilation port for ventilating the inside of the compartment (own compartment). Due to the sealed structure, as a general rule, the air entering the fuel cell compartment 30 from the cell compartment air supply port 30*g* by driving the cell compartment air supply device 36 passes through the cell compartment exhaust port 30*h* and is exhausted from the fuel cell compartment 30.

To ensure sealing, a sealing material is appropriately arranged at a place where a gap may occur. For example, a sealing material is arranged in a portion where a plurality of members are arranged in combination. For example, the sealing material is arranged between the box-shaped member configuring the bottom wall 30*b*, the rear wall 30*c*, the front wall 30*d*, the left wall 30*e*, and the right wall 30*f*, and the top wall 30*a*. Also, for example, the sealing material is arranged in a screw stopper portion. For example, the sealing material is appropriately arranged at an appropriate position in a hole which is provided in the fuel cell compartment 30 and through which an electrical wiring and a piping pass.

(3-2. Tank Compartment)

The tank compartment 40 is a housing body for housing the fuel tank 41 (see, for example, FIG. 2 and FIG. 7 described later). The tank compartment 40 is arranged in the fuel room 14 (see, for example, FIGS. 2 and 4). The tank compartment 40 has a hollow shape. The tank compartment 40 can also be thought of as a container, a chamber, or a box that houses the fuel tank 41.

As illustrated in FIG. 4, in the present embodiment, the fuel room 14 provided behind the engine room 13 and arranged with the tank compartment 40 is divided into two. That is, In the present embodiment, there are two fuel rooms 14. A battery room 15 that houses therein a storage battery (not illustrated) of the storage battery system 5 is arranged between the two fuel rooms 14 in the left-right direction. Thus, when the fuel room 14 and the battery room 15 are arranged together at the rear of the hull 1, it is possible to efficiently utilize the space of the hull 1 and reduce the size of the hull 1.

In the present embodiment, the tank compartment 40 has a hollow and substantially rectangular parallelepiped shape. A longitudinal direction of the tank compartment 40 arranged in the fuel room 14 corresponds to a front-rear direction. An outer wall configuring the tank compartment 40 includes, for example, a top wall 40a, a bottom wall 40b, a rear wall 40c, a front wall 40d, a left wall 40e, and a right wall 40f (for example, see FIGS. 2, 5, and 7 described later). It is noted that the shape of the tank compartment 40 is not particularly limited as long as it has a space capable of housing at least one fuel tank 41. The material of the outer wall of the tank compartment 40 is, for example, FRP, but may be an iron plate and the like.

In detail, the tank compartment 40 is configured so that the top wall 40a is attached to a box-shaped members in which the bottom wall 40b, the rear wall 40c, the front wall 40d, the left wall 40e, and the right wall 40f are configured by a single member. FIG. 7 is a schematic perspective view obtained when a part of the top wall 40a of the tank compartment 40 illustrated in FIG. 5 is removed. In detail, FIG. 7 illustrates the tank compartment 40 located on the left side of the hull 1.

In the present embodiment, the above-mentioned box-shaped member configuring the tank compartment 40 is formed of FRP. The left wall 40e and the right wall 40f are provided with a thin wall part 401 having a thickness thinner in the left-right direction than other portions. A plurality of the thin wall parts 401 are provided on each of the left wall 40e and the right wall 40f. The plurality of thin wall parts 401 have a rectangular shape and are arranged at intervals in the front-rear direction. The thin wall part 401 of the left wall 40e and the thin wall part 401 of the right wall 40f are arranged to face each other in the left-right direction. In the present embodiment, the thin wall part 401 of the left wall 40e and the thin wall part 401 of the right wall 40f are arranged symmetrically with respect to the bisector dividing the above-mentioned box-shaped member into left and right halves. When the thin wall part 401 is provided, it is possible to reduce the weight while maintaining the strength required for the housing body configuring the tank compartment 40. The thin wall part 401 may not be provided. When the thin wall part 401 is provided, the shape, the number, and arrangement of the thin wall part 401 may be appropriately changed from the configuration of the present embodiment.

A frame member 402 formed of a metal such as aluminum is arranged on the upper part of the above-mentioned box-shaped member configuring the tank compartment 40. When the frame member 402 is arranged, it is possible to improve the strength of the housing body configuring the tank compartment 40. When a member such as an eyebolt is attached to the frame member 402, it is possible to lift and install the tank compartment 40 by a crane or the like in building the hull. The frame member 402 includes a frame part 402a having a rectangular shape in a plan view from above, and a plurality of bridging parts 402b that bridge the left and right portions of the frame part 402a. The frame part 402a is arranged on the outer edge of the above-mentioned box-shaped member. The plurality of bridging parts 402b extending in the left-right direction are all linear, and are arranged at intervals in the front-rear direction. When the plurality of bridging parts 402b are arranged, a plurality of rectangular frame member openings 402c are arranged in the front-rear direction in a portion surrounded by the frame member 402.

In detail, the top wall 40a configuring the tank compartment 40 is configured to be divided into a plurality of parts. That is, there are a plurality of the top walls 40a. It is noted that there may be one top wall 40a, but if the top wall 40a is divided into a plurality of parts, for example, it is possible to improve handleability. Each of the plurality of top walls 40a is arranged to cover a frame member opening 402c.

In the present embodiment, the front wall 40d of the tank compartment 40 is provided with a tubular part 403 covering the fuel gas supply pipe 32 and the gas filling pipe 42 that project forward from the tank compartment 40. When the tubular part 403 is arranged, a double pipe structure can be obtained, and even if the fuel gas leaks from the fuel gas supply pipe 32 or the gas filling pipe 42, it is possible to prevent the fuel gas from leaking to the fuel room 14. In the present embodiment, a configuration is employed where the two pipes 32 and 42 pass through one tubular part 403, but a tubular part may be provided for each of the pipes 32 and 42. That is, a plurality of tubular parts forming the double pipe structure may be provided in the tank compartment 40.

Figure 7:
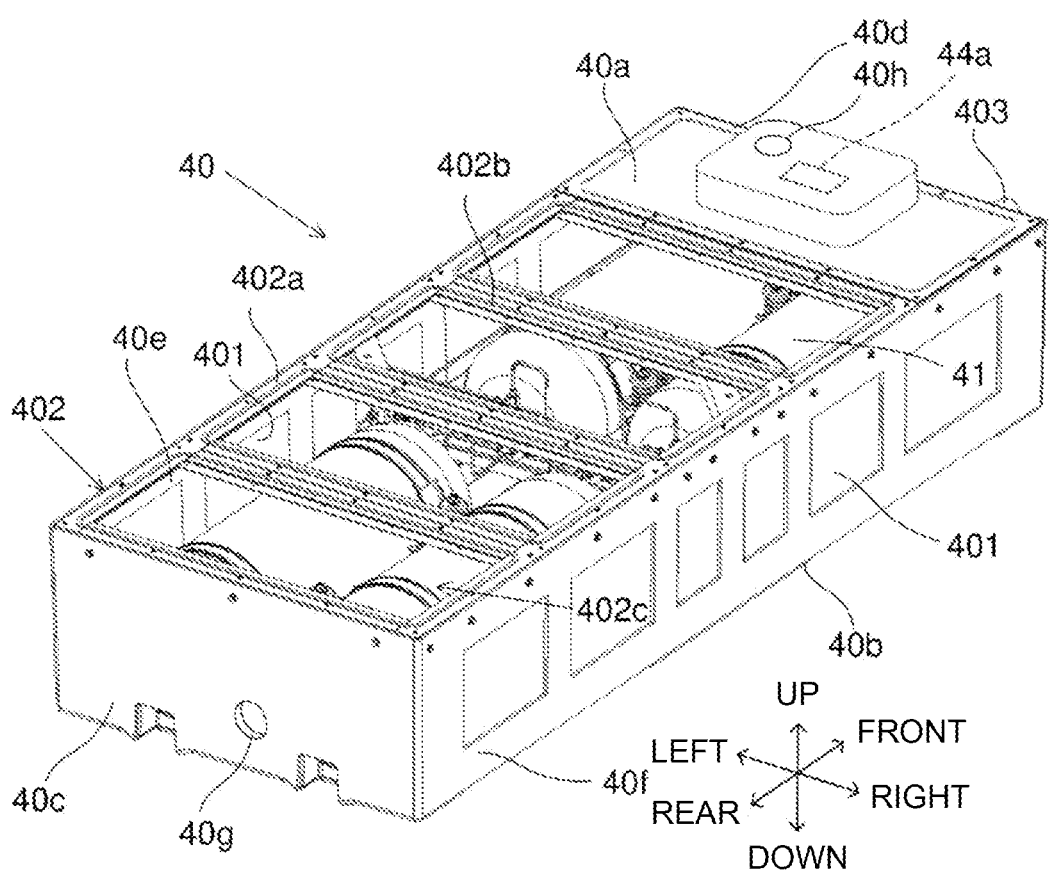
FIG. 7 is a schematic perspective view obtained when a part of the top wall of the tank compartment illustrated in FIG. 5 is removed.

As illustrated in FIG. 7, the four fuel tanks 41 are arranged in the tank compartment 40. The number of the fuel tanks 41 housed in the tank compartment 40 may be appropriately changed, and one or more fuel tanks 41 may be provided. As illustrated in FIG. 2, a part of the fuel gas supply pipe 32 described above and the tank side shutoff valve 43 are further housed in the tank compartment 40. In the tank compartment 40, the tank compartment internal gas detector 44a is further housed. The tank compartment internal gas detector 44a is a fuel gas detector arranged inside the tank compartment 40. For example, if the fuel gas is hydrogen gas, the tank compartment internal gas detector 44a is configured by a hydrogen gas detection sensor.

The tank compartment internal gas detector 44a is arranged on an inner surface of the top wall 40a located at an upper part of the tank compartment 40. Hydrogen gas as the fuel gas is lighter than air and rises. Therefore, if the tank compartment internal gas detector 44a is arranged on the top wall 40a of the tank compartment 40, leaked fuel gas can be appropriately detected by the tank compartment internal gas detector 44a even if the fuel gas leaks in the tank compartment 40.

When the tank compartment internal gas detector 44a detects the fuel gas inside the tank compartment 40, a detection signal is sent from the tank compartment internal gas detector 44a to the control unit 12a. As a result, the control unit 12a can control the tank side shutoff valve 43 provided in the fuel gas supply pipe 32 to stop the supply of the fuel gas from the fuel tank 41 to the fuel cell 31.

The tank compartment 40 includes a ventilation port for ventilating the inside of the compartment. In detail, as illustrated in FIGS. 2 and 7, the ventilation port of the tank compartment 40 includes a tank compartment air supply port 40g and a tank compartment exhaust port 40h.

The tank compartment air supply port 40g is provided on the rear wall 40c of the tank compartment 40. The tank compartment air supply port 40g is configured to include an opening penetrating the rear wall 40c in the front-rear direction. The tank compartment air supply port 40g is connected to a tank compartment air supply pipe 45 described later. It is noted that a place where the tank compartment air supply port 40g is provided may be appropriately changed, and may be another outer wall configuring the tank compartment 40.

The tank compartment exhaust port 40h is provided on the top wall 40a of the tank compartment 40. As described above, in the present embodiment, the top wall 40a of the tank compartment 40 includes a plurality of the top walls 40a arranged in the front-rear direction. The tank compartment exhaust port 40h is arranged on the top wall 40a arranged at the frontmost of the plurality of top walls 40a. However, among the plurality of top walls 40a, the top wall 40a provided with the tank compartment exhaust port 40h may be other than the frontmost top wall 40a. The tank compartment exhaust port 40h is configured to include an opening penetrating the top wall 40a in the up-down direction. The tank compartment exhaust port 40h communicates with the vent pipe 10. The tank compartment exhaust port 40h may be provided on an outer wall instead of the top wall 40c in the tank compartment 40.

The tank compartment air supply pipe 45 is connected to the tank compartment 40. The tank compartment air supply pipe 45 extends from the tank compartment air supply port 40g of the tank compartment 40 to the deck 1a, and is exposed from the top of the deck 1a. A tank compartment air supply device 46 and a tank compartment external gas detector 47 are arranged at an end on the deck 1a side of the tank compartment air supply pipe 45. The tank compartment air supply device 46 and the tank compartment external gas detector 47 are arranged above the deck 1a.

The tank compartment air supply device 46 supplies air outside the tank compartment 40 (in the present example, air outside the ship) to the inside of the tank compartment 40 via the tank compartment air supply pipe 45 and the tank compartment air supply port 40g. Due to the supply of air outside the tank compartment 40, the air inside the tank compartment 40 is discharged to the vent pipe 10 through the tank compartment exhaust port 40h. Thus, the inside of the tank compartment 40 is ventilated. As a result, even if the fuel gas leaks from the fuel tank 41 in the tank compartment 40, the retention of the fuel gas can be suppressed.

The tank compartment air supply device 46 is configured by, for example, an inexpensive non-explosion-proof air supply fan, but may be configured by an explosion-proof air supply fan. The drive of the tank compartment air supply device 46 is controlled by the control unit 12a. Similarly to the above-described cell compartment air supply device 36, the tank compartment air supply device 46 is housed in an air supply device housing BO2 (see, for example, FIG. 5) fixedly arranged on the deck 1a. A filter unit FP2 is connected to the air supply device housing BO2 that houses the tank compartment air supply device 46.

It is noted that the filter unit FP2 is configured in much the same way as the above-described cell compartment air supply device 36. However, the filter unit FP2 connected to the air supply device housing BO2 housing the tank compartment air supply device 46 is not adjacent to the air supply device housing BO2, and is connected to the air supply device housing BO2 via a connection pipe CP. Thus, when the connection pipe CP is provided, it is possible to arrange a suction port for external air when the tank compartment air supply device 46 is driven, at an appropriate position where safety is considered. For example, it is possible to set a distance from the opening leading to the tank compartment 40 (opening on an atmosphere side of the filter unit FP2) to other equipment or the air supply port to a predetermined distance or more.

The tank compartment external gas detector 47 detects a combustible gas (for example, hydrogen gas floating around the hull 1) flowing into the tank compartment 40 from the outside. The tank compartment external gas detector 47 is, for example, a combustible gas sensor such as a hydrogen gas sensor. In the present embodiment, the tank compartment external gas detector 47 is arranged in the air supply device housing BO2. The tank compartment external gas detector 47 is arranged on a side opposite to the tank compartment air supply pipe 45 with respect to the tank compartment air supply device 46, that is, on the upstream side of the air flow from the outside into the tank compartment 40. The tank compartment external gas detector 47 may be configured by a gas sensor that detects a combustible gas other than hydrogen gas.

The tank compartment external gas detector 47 outputs, for example, a detection signal indicating the concentration of the combustible gas to the control unit 12a. This allows the control unit 12a to determine, based on the detection signal, whether the concentration of the combustible gas is equal to or greater than a predetermined threshold value. Then, if the concentration is equal to or greater than the predetermined threshold value, the control unit 12a can control the tank side shutoff valve 43 to stop the supply of the fuel gas from the fuel tank 41 to the fuel cell 31. The above-mentioned predetermined threshold value may be determined based on experiments and/or experience.

It is noted that the above-described tank compartment internal gas detector 44a (see FIG. 2) is arranged on the top wall 40a located at the upper part of the tank compartment 40 at a position close to the tank compartment exhaust port 40h or inside the tank compartment exhaust port 40h. In an unlikely event of fuel gas leak from the fuel tank 41 in the tank compartment 40, the leaked fuel gas goes toward the vent pipe 10 through the tank compartment exhaust port 40h. That is, the tank compartment exhaust port 40h is located on the most downstream side of the flow path through which the fuel gas flows when the fuel gas leaks inside the tank compartment 40. Therefore, when the tank compartment internal gas detector 44a is arranged at a location near the tank compartment exhaust port 40h or inside the tank compartment exhaust port 40h, even if the fuel gas leaks at any location inside the tank compartment 40, it is possible to improve the possibility that the leaked fuel gas can be detected. That is, the tank compartment internal gas detector 44a may be configured to be located on the most downstream side of the flow path through which the fuel gas flows when the fuel gas leaks.

The tank compartment 40 has a sealed space therein except for the tank compartment air supply port 40g and the tank compartment exhaust port 40h. That is, the tank compartment 40 is sealed except for the tank compartment air supply port 40g and the tank compartment exhaust port 40h. In other words, the tank compartment 40 is sealed except for a ventilation port for ventilating the inside of the compartment (own compartment). Due to the sealed structure, as a general rule, the air entering the tank compartment 40 from the tank compartment air supply port 40g by driving the tank compartment air supply device 46 is discharged through the tank compartment exhaust port 40H from the tank compartment 40. To ensure sealing, similarly to the fuel cell compartment 30, a sealing material is appropriately arranged at a place where a gap may occur. For example, inside the tubular part 403 provided in the tank compartment 40, a sealing material for filling the gap between the fuel gas supply pipe 32 and the gas filling pipe 42, and an inner peripheral surface of the tubular part 403 is arranged.

In the present embodiment, the fuel cell compartment 30 and the tank compartment 40 including the emission source of the fuel are sealed except for a ventilation port for ventilating the inside of each compartment, and thus, it is possible to isolate an area not including the emission source of the fuel from an area including the emission source of the fuel. That is, it is possible to reduce the possibility that the fuel invades the area not including the emission source of the fuel and causes an ignition or an explosion.

(3-3. Duct Compartment)

Figure 8:
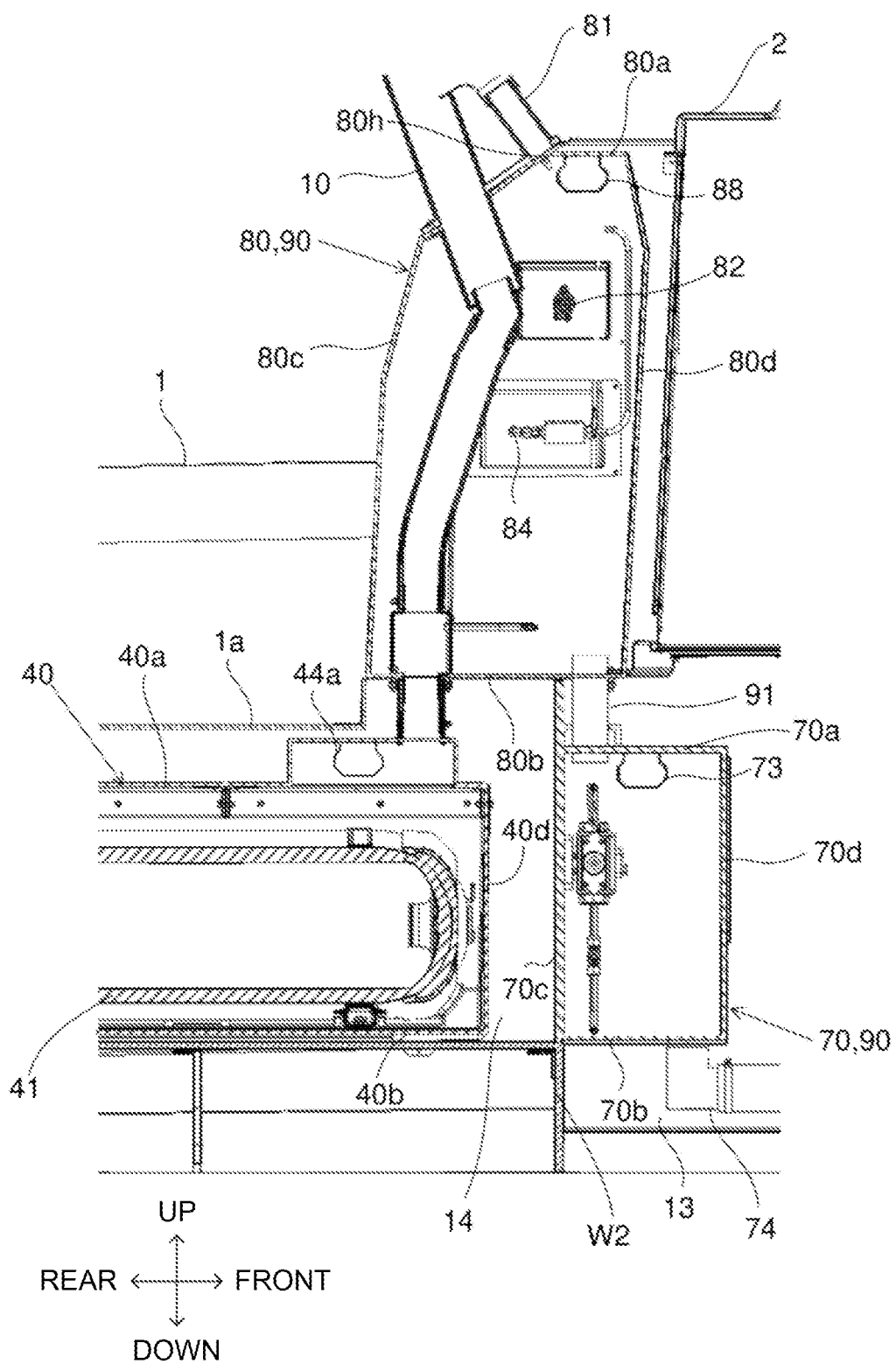
FIG. 8 is an enlarged view illustrating a part of a cross section taken along VIII-VIII of FIG. 3.

FIG. 8 is an enlarged view illustrating a part of a cross section taken along VIII-VIII of FIG. 3. FIG. 8 is a diagram illustrating a configuration of the duct compartment 90 arranged on the left side of the hull 1 and its surrounding area. That is, the duct compartment 90 and the tank compartment 40 illustrated in FIG. 8 belong to the compartment set on the left side (port side), of the two compartment sets arranged on the right side and the left side of the hull 1.

The duct compartment 90 is a housing body that houses various types of pipes (for example, see FIG. 2). As described above, the duct compartment 90 houses a part of the fuel gas supply pipe 32, for example. Further, as described above, the duct compartment 90 includes the lower duct compartment 70 and the upper duct compartment 80. The inside of the lower duct compartment 70 and the inside of the upper duct compartment 80 communicate with each other via a duct communication part 91 extending vertically. The duct communication part 91 can be regarded as a part of the duct compartment 90.

In the present embodiment, in detail, there are two duct communication parts 91 communicating the lower duct compartment 70 and the upper duct compartment 80 (see FIGS. 4 and 5). The number of the duct communication parts 91 is not limited to two, and may be one or three or more. In the following, details of the lower duct compartment 70 and the upper duct compartment 80 will be described.

<3-3-1. Lower Duct Compartment>

The lower duct compartment 70 is arranged below the deck 1a. Specifically, the lower duct compartment 70 is arranged in the engine room 13. In the engine room 13, the lower duct compartment 70 is located rearward of the fuel cell compartment 30. That is, the lower duct compartment 70 is located below the deck 1a between the fuel cell compartment 30 and the tank compartment 40 in the front-rear direction The lower duct compartment 70 houses a part of the fuel gas supply pipe 32, and houses a part of the gas filling pipe 42.

As described above, the "part of the fuel gas supply pipe 32" housed in the lower duct compartment 70 may refer to all or a part of a portion of the fuel gas supply pipe 32 located between the fuel cell compartment 30 and the tank compartment 40. The "part of the gas filling pipe 42" housed in the lower duct compartment 70 may refer to all or a part of a portion of the gas filling pipe 42 located between the tank compartment 40 and the upper duct compartment 80. In the present embodiment, the lower duct compartment 70 houses a part of the portion located between the tank compartment 40 and the upper duct compartment 80 of the gas filling pipe 42.

The lower duct compartment 70 has a hollow shape. The lower duct compartment 70 can also be thought of a container, a chamber, or a box that houses a part of the fuel gas supply pipe 32 and the like. In the present embodiment, the lower duct compartment 70 has a hollow and substantially rectangular parallelepiped shape. An outer wall configuring the lower duct compartment 70 includes, for example, a top wall 70a, a bottom wall 70b, a rear wall 70c, a front wall 70d, a left wall 70e, and a right wall 70f (for example, see FIGS. 2, 5, and 8). It is noted that the shape of the lower duct compartment 70 is not particularly limited as long as it has a space capable of housing a part of the fuel gas supply pipe 32 and the like. The material of the lower duct compartment 70 is, for example, FRP, but may be an iron plate and the like. Further, in the present embodiment, the rear wall 70 of the lower duct compartment 70 is configured by using the partition wall W2 partitioning the engine room 13 and the fuel room 14, but may be configured by not utilizing the partition wall W2.

As illustrated in FIG. 2, the lower duct compartment 70 further houses a part of the fuel gas discharge pipe 71. The fuel gas discharge pipe 71 is a pipe provided by branching from the fuel gas supply pipe 32 located in the lower duct compartment 70. For example, the fuel gas discharge pipe 71 is provided by branching from the fuel gas supply pipe 32 between the two shutoff valves SV.

More specifically, the fuel gas discharge pipe 71 is provided by branching from the fuel gas supply pipe 32 between the tank side shutoff valve 43 in the tank compartment 40 and the fuel cell side shutoff valve 33 in the fuel cell compartment 30. The fuel gas discharge pipe 71 extends from the inside of the lower duct compartment 70 to the inside of the upper duct compartment 80 via a below-described lower duct compartment communication port 70h and the duct communication part 91, and further communicates with the inside of the vent pipe 10. Therefore, the "part of the fuel gas discharge pipe 71" housed in the lower duct compartment 70 may refer to all or a part of a portion in the fuel gas discharge pipe 71 located between the portion branched from the fuel gas supply pipe 32 and the upper duct compartment 80. In the present embodiment, the lower duct compartment 70 houses a part of a portion in the fuel gas discharge pipe 71 arranged between the portion branched from the fuel gas supply pipe 32 and the upper duct compartment 80. It is preferable that as illustrated in FIG. 2, in a portion of the fuel gas discharge pipe 71 that joins the inside of the vent pipe 10, a discharge direction of the fuel gas is an open port side (distal end side) of the vent pipe 10. With such a configuration, it is possible to suppress the fuel gas discharged from the fuel gas discharge pipe 71 into the vent pipe 10 from flowing toward the tank compartment 40. As a result, it is possible to suppress the fuel gas discharged from the fuel gas discharge pipe 71 into the vent pipe 10 from being erroneously detected by the tank compartment internal gas detector 44a in the tank compartment 40.

The lower duct compartment 70 further houses the release valve 72. That is, the duct compartment 90 houses the release valve 72. The release valve 72 is an on-off valve installed in the fuel gas discharge pipe 71 to open or close the flow path of the fuel gas discharge pipe 71. The opening and closing of the release valve 72 is controlled by the control unit 12a. The release valve 72 may be installed in the upper duct compartment 80.

As described above, when the shutoff valve SV installed in the tank compartment 40 is the tank side shutoff valve 43 and the shutoff valve SV installed in the fuel cell compartment 30 is the fuel cell side shutoff valve 33, the fuel cell ship SH further includes, between the tank side shutoff valve 43 and the fuel cell side shutoff valve 33, the fuel gas discharge pipe 71 arranged to be branched from the fuel gas supply pipe 32 and the release valve 72 installed in the fuel gas discharge pipe 71.

The lower duct compartment 70 further houses a lower duct compartment internal gas detector 73. The lower duct compartment internal gas detector 73 is a fuel gas detector arranged inside the lower duct compartment 70. For example, if the fuel gas is hydrogen gas, the lower duct compartment internal gas detector 73 is configured by a hydrogen gas detection sensor.

The lower duct compartment internal gas detector 73 is arranged on the inner surface of the top wall 70a located at an upper portion of the lower duct compartment 70. Hydrogen gas as the fuel gas is lighter than air and rises. Therefore, if the lower duct compartment internal gas detector 73 is arranged on the top wall 70a of the lower duct compartment 70, even if the fuel gas leaks in the lower duct compartment 70, the leaked fuel gas can be appropriately detected by the lower duct compartment internal gas detector 73.

When the lower duct compartment internal gas detector 73 detects the fuel gas in the lower duct compartment 70, a detection signal is sent from the lower duct compartment internal gas detector 73 to the control unit 12a. As a result, the control unit 12a can control the shutoff valves SV provided in the fuel gas supply pipe 32 to stop the supply of the fuel gas from the fuel tank 41 to the fuel cell 31.

As illustrated in FIG. 2, the bottom wall 70b of the lower duct compartment 70 is provided with a lower duct compartment air supply port 70g. The lower duct compartment air supply port 70g is configured to include an opening penetrating in the up-down direction. The lower duct compartment air supply port 70g is connected to a duct compartment air supply pipe 74 described later. The lower duct compartment air supply port 70g may be provided on an outer wall other than the bottom wall 70d in the lower duct compartment 70.

The top wall 70a of the lower duct compartment 70 is provided with a lower duct compartment communication port 70h. The lower duct compartment communication port 70h is configured to include an opening penetrating in the up-down direction. The lower duct compartment communication port 70h communicates with the above-described duct communication part 91. The lower duct compartment communication port 70h may be provided on an outer wall other than the top wall 70a in the lower duct compartment 70.

The front wall 70d of the lower duct compartment 70 is provided with a cell compartment communication port 70i. The cell compartment communication port 70i is configured to include an opening penetrating in the front-rear direction. The cell compartment communication port 70 is connected to the cell compartment exhaust port 30h of the fuel cell compartment 30 described above via a communication pipe 92 extending in the front-rear direction. As a result, when the cell compartment air supply device 36 is driven, the air inside the fuel cell compartment 30 flows into the lower duct compartment 70 via the cell compartment exhaust port 30h, the communication pipe 92, and the cell compartment communication port 70i. The cell compartment communication port 70i may be provided on an outer wall other than the front wall 70d in the lower duct compartment 70.

In the present embodiment, the fuel gas supply pipe 32 passes through the inside of the communication pipe 92. In other words, the communication pipe 92 is arranged outside the fuel gas supply pipe 32 and configures a double pipe together with the fuel gas supply pipe 32. That is, the fuel cell ship SH further includes an outer pipe being arranged outside the fuel supply pipe and configuring a double pipe together with the fuel supply pipe. If a double pipe surrounding the fuel supply pipe with an outer pipe is employed, it is possible to reduce the possibility of the fuel entering the engine room 13 even if the fuel leak occurs in the fuel supply pipe.

A front end of the communication pipe 92 surrounds the cell compartment exhaust port 30h arranged in the fuel cell compartment 30 and is connected to the fuel cell compartment 30. That is, one end of the outer pipe configuring the double pipe is connected to the fuel cell compartment by surrounding a ventilation port for exhaust of the fuel cell compartment. With such a configuration, the double pipe structure provided for ensuring safety can be effectively utilized for an exhaust path for ventilation of the fuel cell compartment.

Further, in the present embodiment, a rear end of the communication pipe 92 is connected to the lower duct compartment 70 by surrounding the cell compartment communication port 70i provided in the lower duct compartment 70. Therefore, the lower duct compartment 70 and the fuel cell compartment 30 communicate with each other via the communication pipe 92. That is, the duct compartment and the fuel cell compartment communicate with each other via the outer pipe configuring the double pipe. Thus, it is possible to send the exhaust gas for ventilation of the fuel cell compartment to the inside of the duct compartment and discharge such an exhaust gas to the outside together with the exhaust gas for ventilation of the duct compartment. That is, it is possible to compactly configure the exhaust path for ventilation in the fuel cell ship SH.

It is preferable that the fuel gas supply pipe 32 configuring an inner pipe of the double pipe and the communication pipe 92 configuring the outer pipe are configured by a material having an equivalent performance in pressure resistance. For example, if the fuel gas supply pipe 32 is formed of stainless steel, it is preferable that the communication pipe 92 is also formed of stainless steel. However, for example, if a structure is adopted that allows the fuel gas to escape safely to the outside of the fuel cell ship SH by avoiding the explosion of an outer pipe even if the fuel gas leaks in the inner pipe, the outer pipe may be lower in pressure resistance performance than the inner pipe. In the present embodiment, such a structure is adopted, and thus, the fuel gas supply pipe 32 is formed of stainless steel, and the communication pipe 92 is formed of FRP.

A duct compartment air supply pipe 74 is connected to the lower duct compartment 70 (see, for example, FIGS. 2 and 8). The duct compartment air supply pipe 74 extends from the lower duct compartment air supply port 70g of the lower duct compartment 70 to the deck 1a and is exposed from the top of the deck 1a. A duct compartment air supply device 75 and a duct compartment external gas detector 76 are arranged at an end on the deck 1a side of the duct compartment air supply pipe 74. The duct compartment air supply device 75 and the duct compartment external gas detector 76 are arranged above the deck 1a.

The duct compartment air supply device 75 supplies the air outside the lower duct compartment 70 (duct compartment 90) (in the present example, air outside the ship) into the lower duct compartment 70 via the duct compartment air supply pipe 74 and the lower duct compartment air supply port 70g. Due to the supply of the air outside the lower duct compartment 70, the air inside the lower duct compartment 70 is discharged to the upper duct compartment 80 via the lower duct compartment communication port 70h and the duct communication part 91. Thus, the inside of the lower duct compartment 70 is ventilated. As a result, even if the fuel gas leaks from a pipe such as the fuel gas supply pipe 32 in the lower duct compartment 70, retention of the fuel gas can be suppressed.

The duct compartment air supply device 75 is configured by, for example, an inexpensive non-explosion-proof air supply fan, but may be configured by an explosion-proof air supply fan. The drive of the duct compartment air supply device 75 is controlled by the control unit 12a. Similarly to the above-described cell compartment air supply device 36, the duct compartment air supply device 75 is housed in an air supply device housing BO3 (see, for example, FIGS. 3 and 5) fixedly arranged on the deck 1a. The air supply device housing BO3 that houses the duct compartment air supply device 75 is connected with the filter unit FP3, similarly to the above-described cell compartment air supply device 36.

The duct compartment external gas detector 76 detects a combustible gas (for example, hydrogen gas floating around the hull 1) flowing into the duct compartment 90 from the outside. The duct compartment external gas detector 76 is, for example, a combustible gas sensor such as a hydrogen gas sensor. The duct compartment external gas detector 76 is arranged on a side opposite to the duct compartment air supply pipe 74 with respect to the duct compartment air supply device 75, that is, on the upstream side of the air flow from the outside into the duct compartment 90. The duct compartment external gas detector 76 may be configured by a gas sensor that detects a combustible gas other than hydrogen gas.

The duct compartment external gas detector 76 outputs, for example, a detection signal indicating the concentration of the combustible gas to the control unit 12a. This allows the control unit 12a to determine, based on the detection signal, whether the concentration of the combustible gas is equal to or greater than a predetermined threshold value. Then, if the concentration is equal to or greater than the predetermined threshold value, the control unit 12a can control the shutoff valves SV to stop the supply of the fuel gas from the fuel tank 41 to the fuel cell 31. The above-mentioned predetermined threshold value may be determined based on experiments and/or experience.

The above-described lower duct compartment internal gas detector 73 is arranged at a position close to the lower duct compartment communication port 70h or inside the lower duct compartment communication port 70h on the top wall 70a located at an upper portion of the lower duct compartment 70. In an unlikely event of the fuel gas leak from the fuel gas supply pipe 32 and the like in the lower duct compartment 70, the leaked fuel gas goes toward the upper duct compartment 80 through the lower duct compartment communication port 70h. That is, the lower duct compartment communication port 70h is located on the most downstream side of the flow path through which the fuel gas flows when the fuel gas leaks in the lower duct compartment 70. Therefore, as a result of the lower duct compartment internal gas detector 73 being arranged at a place near the lower duct compartment communication port 70h or inside the lower duct compartment communication port 70h, even if the fuel gas leaks at any location inside the lower duct compartment 70h, it is possible to increase the possibility that the leaked fuel gas can be detected.

The lower duct compartment 70 has a sealed space therein except for the lower duct compartment air supply port 70g, the lower duct compartment communication port 70h, and the cell compartment communication port 70i. That is, the lower duct compartment 70 is sealed except for the lower duct compartment air supply port 70g, the lower duct compartment communication port 70h, and the cell compartment communication port 70i. Due to the sealed structure, in principle, when the duct compartment air supply device 75 and the cell compartment air supply device 36 are driven, the air entering the lower duct compartment 70 from the lower duct compartment air supply port 70g and the cell compartment communication port 70i is discharged from the lower duct compartment 70 after passing through the lower duct compartment communication port 70h. To ensure sealing, a sealing material is appropriately arranged at a place where a gap may occur.

<3-3-2. Upper Duct Compartment>

The upper duct compartment 80 is arranged on the deck 1a. More specifically, the upper duct compartment 80 is arranged on the deck 1a to cover an area partially including the lower duct compartment 70 and the tank compartment 40. In the present embodiment, the upper duct compartment 80 is arranged rearward of the cabin 2 and is configured by using a member configuring the cabin 2. That is, it can be said that the upper duct compartment 80 is a part of the cabin 2. The upper duct compartment 80 houses a part of the fuel gas discharge pipe 71 and houses a part of the gas filling pipe 42.

In the present embodiment, the "part of the fuel gas discharge pipe 71" housed in the upper duct compartment 80 is a portion from the upper end of the duct communication part 91 to the vent pipe 10, of the fuel gas discharge pipe 71. Further, the "part of the gas filling pipe 42" housed in the upper duct compartment 80 is a portion from the fuel gas filling port 82 provided in the upper duct compartment 80 to the duct communication part 91, of the gas filling pipe 42. The duct communication part 91 configures a double pipe together with the fuel gas discharge pipe 71 and the gas filling pipe 42. As a result, even if the fuel gas leaks in the fuel gas discharge pipe 71 or the gas filling pipe 42, it is possible to prevent the fuel gas from entering the engine room 13. The duct communication part 91 is formed of, for example, FRP or stainless steel.

The upper duct compartment 80 has a hollow shape. The upper duct compartment 80 can also be thought of a container, a chamber, or a box that houses a part of the fuel gas discharge pipe 71 and the like. In the present embodiment, as illustrated in FIGS. 2 and 8, an outer wall configuring the upper duct compartment 80 includes, for example, a top wall 80a, a bottom wall 80b, a rear wall 80c, a front wall 80d, a left wall (not illustrated), and a right wall (not illustrated). Specifically, the rear wall 80c has an inclined structure inclined rearward as its slant goes downward. In more detail, the rear wall 80c is configured by a plurality of inclined parts having different inclination angles, and the plurality of inclined parts have a structure in which its upper side has a larger inclination than its lower side. The material of the upper duct compartment 80 is, for example, FRP, but may be an iron plate and the like. The shape of the upper duct compartment 80 is not particularly limited as long as it has a space capable of housing a part of the fuel gas discharge pipe 71 and the like.

As illustrated in FIG. 2, the fuel gas filling port 82 and a fuel gas check valve 83 are provided in the upper duct compartment 80. The fuel gas filling port 82 is connected to the gas filling pipe 42. The fuel gas check valve 83 is provided in the gas filling pipe 42. More specifically, the fuel gas check valve 83 is located between a branch portion between the gas filling pipe 42 and an inert gas pipe 87 described later, and the fuel gas filling port 82.

When the fuel gas is supplied from the fuel gas filling port 82, the fuel gas is supplied to the fuel tank 41 in the tank compartment 40 through the gas filling pipe 42 via the fuel gas check valve 83. As a result, the fuel gas is filled and stored in the fuel tank 41. The fuel gas check valve 83 is provided to prevent backflow of the fuel gas from the fuel tank 41 side to the fuel gas filling port 82.

The upper duct compartment 80 is further provided with an inert gas filling port 84, an on-off valve 85, an inert gas check valve 86, and an inert gas pipe 87. The inert gas filling port 84 is connected to the inert gas pipe 87. The inert gas pipe 87 is provided by branching from the gas filling pipe 42 in the upper duct compartment 80. The on-off valve 85 and the inert gas check valve 86 are provided in the inert gas pipe 87. In the inert gas pipe 87, the on-off valve 85 is located between the inert gas filling port 84 and the inert gas check valve 86.

The on-off valve 85 opens or closes the flow path of the inert gas pipe 87. In a configuration in which the inert gas check valve 86 is provided in the inert gas pipe 87, installation of the on-off valve 85 may be omitted.

When an inert gas is supplied to the inert gas filling port 84 and the on-off valve 85 opens the flow path of the inert gas pipe 87 in a state in which the fuel gas is not supplied to the fuel gas filling port 82, the inert gas is supplied to the fuel tank 41 in the tank compartment 40 through the inert gas check valve 86, and via the inert gas pipe 87 and the gas filling pipe 42. In addition, the tank side shutoff valve 43 opens the flow path of the fuel gas supply pipe 32, the fuel cell side shutoff valve 33 closes the flow path of the fuel gas supply pipe 32, and the release valve 72 opens the flow path of the fuel gas discharge pipe 71, whereby the fuel gas remaining in the fuel tank 41 is discharged to the vent pipe 10 via the fuel gas supply pipe 32 and the fuel gas discharge pipe 71. As a result, the fuel gas can be removed from the fuel tank 41 (purge process). There may be a pipe directly connected from the gas filling pipe 42 to the fuel gas supply pipe 32 between the fuel tank 41 and the tank side shutoff valve 43 (tank method). In this configuration, in a process of purging the inert gas of the fuel tank 41, the inert gas is filled into the fuel tank 41 in a state in which the tank side shutoff valve 43 is closed, and after that, it is necessary to open the tank side shutoff valve 43 for the purpose of facilitating the release of the inert gas from the fuel tank 41.

An upper duct compartment internal gas detector 88 is housed in the upper duct compartment 80. The upper duct compartment internal gas detector 88 is a fuel gas detector arranged inside the upper duct compartment 80. For example, if the fuel gas is hydrogen gas, the upper duct compartment internal gas detector 88 is configured by a hydrogen gas detection sensor.

The upper duct compartment internal gas detector 88 is arranged on the top wall 80a located at an upper portion of the upper duct compartment 80. Hydrogen gas as a fuel gas is lighter than air and rises. Therefore, even if the fuel gas leaks in the upper duct compartment 80, the leaked fuel gas can be appropriately detected by the upper duct compartment internal gas detector 88.

When the upper duct compartment internal gas detector 88 detects the fuel gas in the upper duct compartment 80, a detection signal is sent from the upper duct compartment internal gas detector 88 to the control unit 12a. As a result, the control unit 12a can control the shutoff valves SV provided in the fuel gas supply pipe 32 to stop the supply of the fuel gas from the fuel tank 41 to the fuel cell 31.

An upper duct compartment air supply port 80g is provided in the bottom wall 80d of the upper duct compartment 80. The upper duct compartment air supply port 80g is configured to include an opening penetrating in the up-down direction. The upper duct compartment air supply port 80g communicates with the duct communication part 91. Therefore, the upper duct compartment 80 communicates with the lower duct compartment 70 via the upper duct compartment air supply port 80g, the duct communication part 91, and the lower duct compartment communication port 70h. The upper duct compartment air supply port 80g may be provided on an outer wall other than the bottom wall 80b in the upper duct compartment 80.

An upper duct compartment exhaust port 80h is provided in the vicinity of a boundary between the rear wall 80c of the upper duct compartment 80 and the top wall 80a. The upper duct compartment exhaust port 80h is configured to include an opening penetrating the rear wall 80c. The upper duct compartment exhaust port 80h communicates with the vent pipe communication part 81. The vent pipe communication part 81 is a pipe. The inside of the upper duct compartment 80 communicates with the vent pipe 10 via the upper duct compartment exhaust port 80h and the vent pipe communication part 81. That is, the vent pipe communication part 81 is a pipe communicating the inside of the upper duct compartment 80 with the vent pipe 10.

The vent pipe 10 extends upward from the tank compartment 40 and passes through the interior of the upper duct compartment 80. More specifically, the vent pipe 10 penetrates through the bottom wall 80b of the upper duct compartment 80, enters the inside of the upper duct compartment 80, and goes out through the rear wall 80c.

In a state where the duct compartment air supply device 75 is driven, the air inside the upper duct compartment 80 is discharged to the outside of the ship through the vent pipe communication part 81 and the vent pipe 10. Thus, it is possible to ventilate the inside of the upper duct compartment 80. Even if the fuel gas leaks from the fuel gas discharge pipe 71 in the upper duct compartment 80, the leaked fuel gas is discharged to the outside of the ship through the vent pipe communication part 81 and the vent pipe 10. Thus, it is possible to prevent the leaked fuel gas from remaining in the upper duct compartment 80.

The upper duct compartment 80 and the lower duct compartment 70 communicate with each other via the duct communication part 91. As a result, (1) air taken into the inside of the lower duct compartment 70 via the duct compartment air supply pipe 74, (2) the fuel gas leaked from the fuel gas supply pipe 32 in the lower duct compartment 70 for some reason, and (3) air or the fuel gas discharged from the fuel cell compartment 30 to the lower duct compartment 70 via the communication pipe 92 can be discharged to the outside of the ship via the upper duct compartment 80 and the vent pipe 10. This enables suppression of the retention of fuel gas inside the lower duct compartment 70 and inside the fuel cell compartment 30.

The above-described upper duct compartment internal gas detector 88 is arranged at a position close to the upper duct compartment exhaust port 80h or inside the upper duct compartment exhaust port 80h. In an unlikely event of the fuel gas leak from the fuel gas discharge pipe 71 or the gas filling pipe 42 in the upper duct compartment 80, the leaked fuel gas moves toward the vent pipe 10 through the upper duct compartment exhaust port 80h. That is, the upper duct compartment exhaust port 80h is located on the most downstream side of the flow path through which the fuel gas flows when the fuel gas leaks in the upper duct compartment 80. Therefore, as a result of the upper duct compartment internal gas detector 88 being provided at a position close to the upper duct compartment exhaust port 80h or inside the upper duct compartment exhaust port 80h, even if the fuel gas leaks at any location inside the upper duct compartment 80, it is possible to detect the leaked fuel gas. In the present embodiment, as a preferred mode, the upper duct compartment internal gas detector 88 is installed at a position at which it is possible to detect hydrogen gas accumulated on a ceiling plate of the upper duct compartment 80. As a result, it is possible to quickly detect the leakage of the hydrogen gas even if there is no passage of air for ventilation.

The upper duct compartment 80 has a sealed space therein except for the upper duct compartment air supply port 80g and the upper duct compartment exhaust port 80h. That is, the upper duct compartment 80 is sealed except for the upper duct compartment air supply port 80g and the upper duct compartment exhaust port 80h. Due to the sealed structure, in principle, when the duct compartment air supply device 75 and the cell compartment air supply device 36 are driven, the air entering the upper duct compartment 80 from the upper duct compartment air supply port 80g is discharged from the upper duct compartment 80 after passing through the upper duct compartment exhaust port 80h. To ensure sealing, a sealing material is appropriately arranged at a place where a gap may occur.

As can be seen from the above description, the duct compartment 90 is sealed except for a ventilation port for ventilating the inside of the compartment (the duct compartment 90). In addition to the fuel cell compartment 30 and the tank compartment 40, the duct compartment including the emission source of the fuel is sealed except for the ventilation port for ventilating the inside, and thus, it is possible to further reduce the possibility that the fuel invades the area not including the emission source of the fuel and causes an ignition or an explosion.

[4. Vent Pipe]

As can be seen from the above description, the fuel cell ship SH includes the vent pipe 10 through which the fuel in the compartment including the emission source of the fuel can be released to the outside (outside the ship) of the hull 1. In particular, not only the fuel but also the air and an explosive pressure (blast) can be released through the vent pipe 10 to the outside of the ship. In the present embodiment, one vent pipe 10 is provided on each of the right side and the left side of the hull 1. That is, the fuel cell ship SH includes the two vent pipes 10. The two vent pipes 10 are configured and function identically.

The vent pipe 10 may be configured of only one piping member or may be configured by combining a plurality of the piping members. If the vent pipe 10 is configured by combining the plurality of piping members, the plurality of piping members may all be formed of the same material or may be formed of materials different from one another. The number of the vent pipes 10 included in the fuel cell ship SH may be appropriately changed depending on, for example, a manner to configure the compartment.

Figure 9:
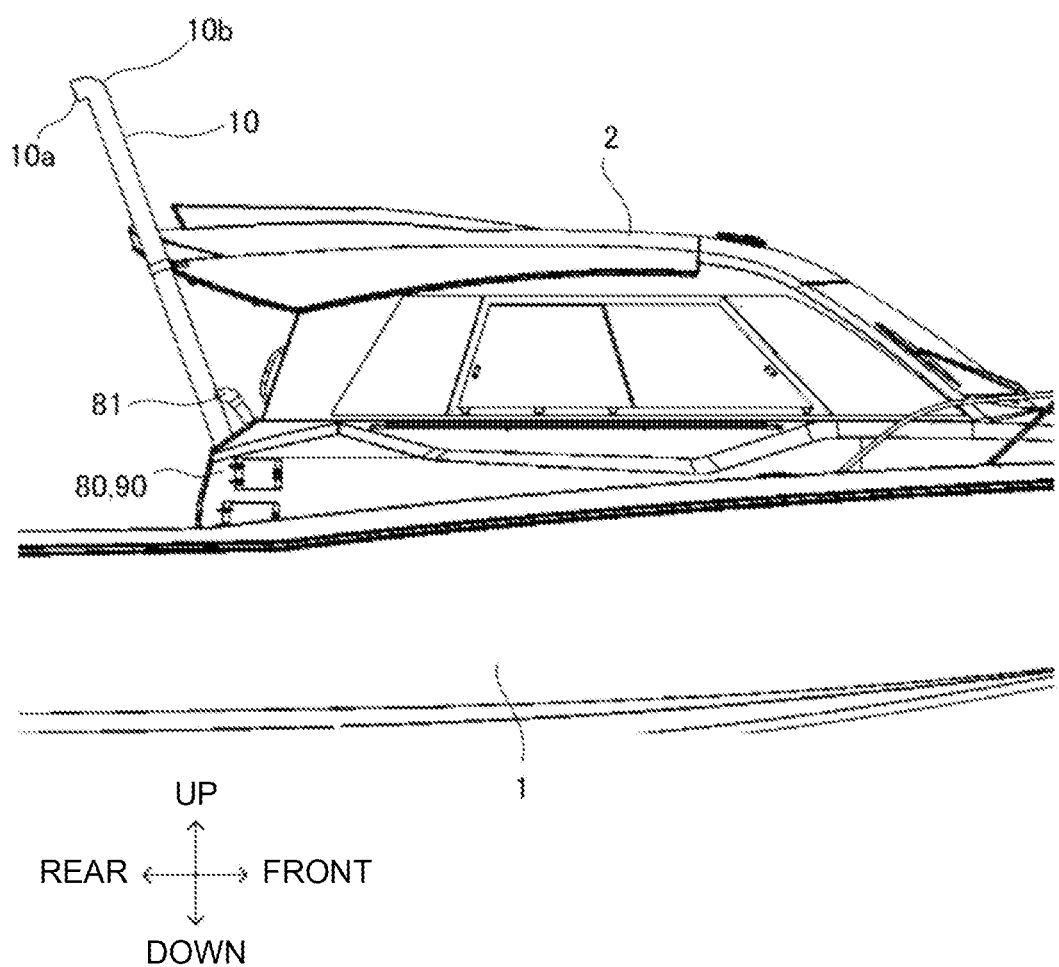
FIG. 9 is a diagram illustrating a part of a side surface of the fuel cell ship illustrated in FIG. 3.

FIG. 9 is a diagram illustrating a part of a side surface of the fuel cell ship SH illustrated in FIG. 3. As illustrated in FIG. 9, a release port 10a of the vent pipe 10 is located at a position higher than the cabin 2 provided in the hull 1. With such a configuration, it is possible to release the fuel leaked in the compartment including the emission source of the fuel to a position higher than the cabin 2 via the vent pipe 10. That is, it is possible to guide the fuel leaked in the compartment to a safe place in the atmosphere, and thus, it is possible to prevent ignition or explosion on the deck 1a resulting from the fuel floating on the deck 1a. Even if the blast is released from the vent pipe 10, the release port 10a is located at a position higher than the cabin 2, and thus, it is possible to reduce the possibility of human damage.

In the present embodiment, the fuel cell ship SH is configured to include the cabin 2 including the bridge, but the fuel cell ship SH may be configured to include only the bridge. In a case of such a configuration, it is only required that a configuration is employed where the release port 10a of the vent pipe 10 is located at a position higher than the bridge provided on the hull 1.

As described above, in the present embodiment, the leaked fuel in the fuel cell compartment 30, the tank compartment 40, and the duct compartment 90 is released from the vent pipe 10. With such a configuration, in each of the compartments 30, 40, and 90 where the fuel leaks may possibly occur, it is possible to guide the leaked fuel to a safe place in the atmosphere. That is, it is possible to further reduce the possibility of ignition or explosion on the deck 1a due to the fuel floating on the deck 1a.

In the present embodiment, on each of the right side and the left side of the hull 1, the fuel cell compartment 30, the tank compartment 40, and the duct compartment 90 share one vent pipe 10 as the exhaust path of the leaked fuel. That is, the fuel leaked in each of the compartments 30, 40, and 90 is released to the outside of the ship through the same vent pipe 10. With such a configuration, it is possible to reduce the number of vent pipes 10 to achieve a simple configuration of the fuel cell ship SH.

In the present embodiment, at least a part of the vent pipe 10 is arranged above the tank compartment 40. With such a configuration, it is possible to arrange the vent pipe 10 near the compartment including the emission source of the fuel, and thus, it is possible to suppress the exhaust path including the vent pipe 10 from being complicated. The tank compartment 40 is a place where a large amount of fuel is particularly arranged, and thus, if the vent pipe 10 is arranged near the tank compartment 40, it is possible to more effectively obtain the effect of releasing the blast by the vent pipe 10. More particularly, as illustrated in FIG. 8, the vent pipe 10 has its one end side being attached to the top wall 40a at the front of the tank compartment 40 and a majority of its body being located above the tank compartment 40.

The vent pipe 10 passes through the cabin 2. With such a configuration, it is possible to firmly hold a lower side of the vent pipe 10. That is, it is possible to reduce the possibility of damage such as breakage of the vent pipe 10. The vent pipe 10 is configured not to be easily damaged, and thus, it is possible to further improve the safety.

More particularly, the vent pipe 10 passes through the upper duct compartment 80 provided as a part of the cabin 2. The vent pipe 10 penetrates the upper duct compartment 80 upward to position the release port 10a at a high position outside the ship. In such a configuration, it is possible to support the lower side of the vent pipe 10 by using the upper duct compartment 80, and thus, it is possible to increase support locations and regions of the vent pipe 10 to firmly support the vent pipe 10.

As described above, the fuel cell ship SH may be configured to include only the bridge. In a case of such a configuration, the vent pipe 10 may be configured to pass through the bridge. Even in such a configuration, it is possible to firmly support the vent pipe 10 to prevent the vent pipe 10 from being easily damaged.

It is preferable that at least a portion of the vent pipe 10 protruding to the outside of the hull 1 is arranged to be inclined toward a stern side (rear side) as going upward. With such a configuration, it is possible to reduce the possibility that the vent pipe 10 is broken by a wind received when the fuel cell ship SH moves forward.

In the present embodiment, a portion of the vent pipe 10 arranged inside the hull 1 is not necessarily arranged to be inclined toward the stern side as going upward (see FIG. 8). It is possible to easily realize such a structure, for example, by forming the vent pipe 10 by the plurality of piping members. When the vent pipe 10 is formed of the plurality of piping members, it is possible to easily adjust the overall arrangement while a part of the vent pipe 10 is arranged to be inclined.

In the present embodiment, as illustrated in FIG. 9, an upper distal end portion of the vent pipe 10 is provided with a bent part 10b that directs the release port 10a toward a stern direction (rear direction). With such a configuration, it is possible to suppress a falling object from above such as rain from entering the vent pipe 10 via the release port 10a while releasing the fuel in a safe direction via the release port 10a.

The release port 10a directed in the stern direction may be configured to open in a direction parallel to the front-rear direction. However, it is preferable that the release port 10a is configured to be inclined with respect to the front-rear direction and to open diagonally downward. That is, it is preferable that the bent part 10b has a configuration in which the release port 10a is directed diagonally downward in the stern direction. As a result, it is possible to further reduce the possibility that a falling object from above such as rain enters the vent pipe 10 via the release port 10a. Another configuration may be employed where a rain shield member that suppresses rain from entering via the release port 10a of the vent pipe 10 is arranged at a distal end portion of the vent pipe 10.

[5. Points to Note]

The various technical features disclosed herein can be modified in various ways without departing from the gist of the technical creation. In addition, a plurality of embodiments and modifications illustrated provided herein may be combined and implemented where possible.

Thus, a configuration is employed where at least a part of the vent pipe 10 is arranged above the tank compartment 40. However, this is an example. It is preferable that at least a part of the vent pipe 10 is arranged above any one of the tank compartment 40 and the fuel cell compartment 30, or above a space between the tank compartment 40 and the fuel cell compartment 30. With such a configuration, it is possible to arrange the vent pipe near the compartment including the emission source of the fuel, and thus, it is possible to suppress the exhaust path including the vent pipe from being complicated.

It is noted that in the configuration in which the tank compartment 40 and the fuel cell compartment 30 are arranged in the front-rear direction as in the present embodiment, the space between the tank compartment 40 and the fuel cell compartment 30 is a space between the tank compartment 40 and the fuel cell compartment 30 in the front-rear direction. In the space between the tank compartment 40 and the fuel cell compartment 30, it is not necessarily required that a certain member is arranged.

REFERENCE SIGNS LIST

1 . . . Hull
2 . . . Cabin
10 . . . Vent pipe
10a . . . Release port
10b . . . Bent part
30 . . . Fuel cell compartment
31 . . . Fuel cell
32 . . . Fuel gas supply pipe (fuel supply pipe)
40 . . . Tank Compartment
41 . . . Fuel tank
70 . . . Lower duct compartment (duct compartment)
80 . . . Upper duct compartment (duct compartment)
90 . . . Duct compartment
SH . . . Fuel cell ship

The invention claimed is:

1. A fuel cell ship for propelling a hull by using electric power supplied by a fuel cell configured to generate electric power through an electrochemical reaction of fuel, the fuel cell ship comprising:
   at least one compartment including an emission source of the fuel, wherein the emission source includes the fuel cell and a fuel tank that stores the fuel, and wherein the at least one compartment includes:
      a fuel cell compartment in which the fuel cell is disposed, wherein the fuel cell compartment is sealed,
      a fuel tank compartment in which the fuel tank is disposed, wherein the fuel tank compartment is sealed, and
      a third compartment that is sealed; and
   a vent pipe through which the fuel in the at least one compartment is configured to be released to outside of the hull, wherein a release port of the vent pipe is located at a position higher than a cabin or a bridge provided on the hull,
   wherein each of the fuel cell compartment and the fuel tank compartment is in fluid communication with the vent pipe,
   wherein the fuel cell compartment is in fluid communication with the vent pipe via the third compartment, and
   wherein an upper portion of the third compartment is disposed above a deck of the hull and a lower portion of the third compartment is disposed below the deck of the hull.

2. The fuel cell ship according to claim 1, further comprising:
   a fan that drives air;
   a first pipe that fluidly connects the fuel cell compartment and a duct compartment such that the fan can drive air from the fuel cell compartment to the duct compartment via the first pipe; and
   wherein a fluid supply pipe is disposed within the first pipe such that the air flows within the first pipe and external to the fluid supply pipe.

3. The fuel cell ship according to claim 1, wherein a portion of a duct compartment is disposed within the cabin.

4. The fuel cell ship according to claim 1, wherein the third compartment includes an upper portion that is disposed above a deck of the hull and a lower portion that is disposed below the deck of the hull, and a portion of the fuel supply pipe that is disposed within a duct compartment is disposed within the lower portion of the third compartment.

\* \* \* \* \*